United States Patent [19]

Nelson

[11] Patent Number: 5,142,303
[45] Date of Patent: Aug. 25, 1992

[54] PRINTING SYSTEM EXPOSURE MODULE OPTIC STRUCTURE AND METHOD OF OPERATION

[75] Inventor: William E. Nelson, Dallas, Tex.

[73] Assignee: Texas Instruments Incorporated, Dallas, Tex.

[21] Appl. No.: 763,472

[22] Filed: Sep. 20, 1991

Related U.S. Application Data

[63] Continuation of Ser. No. 454,812, Dec. 21, 1989.

[51] Int. Cl.⁵ ............................................. H04N 1/21
[52] U.S. Cl. .................................. 346/108; 359/291; 359/318
[58] Field of Search ................ 346/108, 107 R, 76 C, 346/160; 355/202; 359/315, 316, 317, 318, 291; 358/296

[56] References Cited

U.S. PATENT DOCUMENTS

| | | | |
|---|---|---|---|
| 3,781,106 | 12/1973 | Lysle | 346/74 |
| 4,596,992 | 6/1986 | Hornbeck | 346/76 |
| 4,662,746 | 5/1987 | Hornbeck | 350/269 |
| 4,710,732 | 12/1987 | Hornbeck | 350/269 |
| 4,728,185 | 3/1988 | Thomas | 353/122 |

Primary Examiner—Mark J. Reinhart
Attorney, Agent, or Firm—Julie L. Schneider; James C. Kesterson; Richard L. Donaldson

[57] ABSTRACT

There is disclosed a deformable mirror device (DMD) exposure unit and method of operation for use in a xerographic printing system. The exposure unit is constructed with an integral unmodulated light source condensing light onto a substrate containing, in one embodiment, a multi-row set of deflectable mirrors. The deflection of each mirror is controlled by electronic circuitry established on the same monolithic integrated substrate. The substrate is arranged with mirror elements which can be adjusted easily during assembly to eliminate time consuming construction or maintenance routines. An optic structure, using integral light baffles and deflection edges, assures the proper contrast and light energy level at the image. In the case of multiple rows of pixels, the on-chip circuitry acts to reregister the spatially separated images through a suitable time delay. The formation of printed images of suitable uniformity and quality is achieved by the incorporation of an overlap factor relative to the multiple rows of pixels as defined on the integrated substrate.

21 Claims, 23 Drawing Sheets

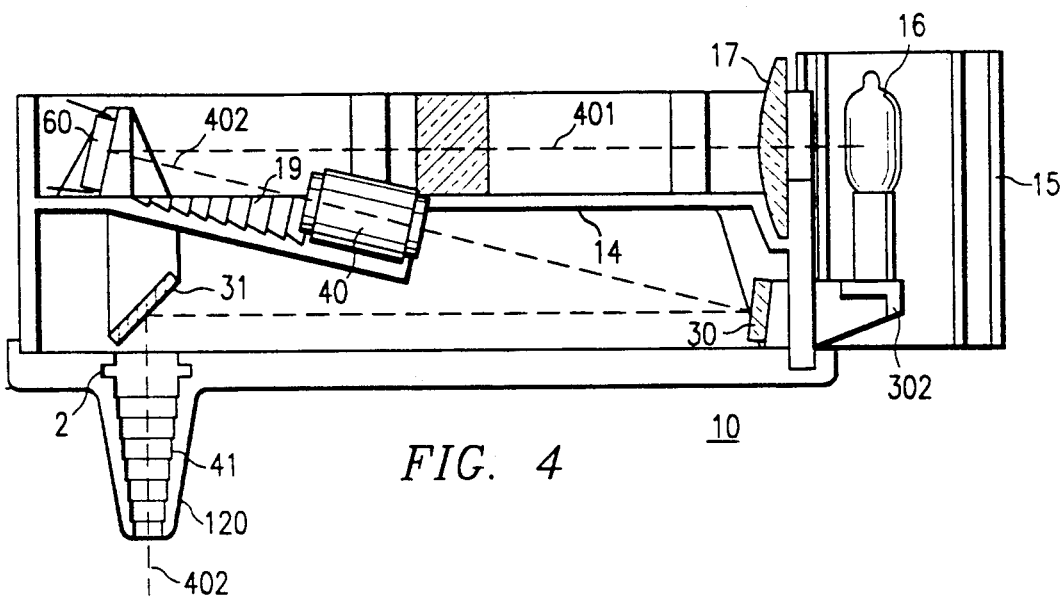
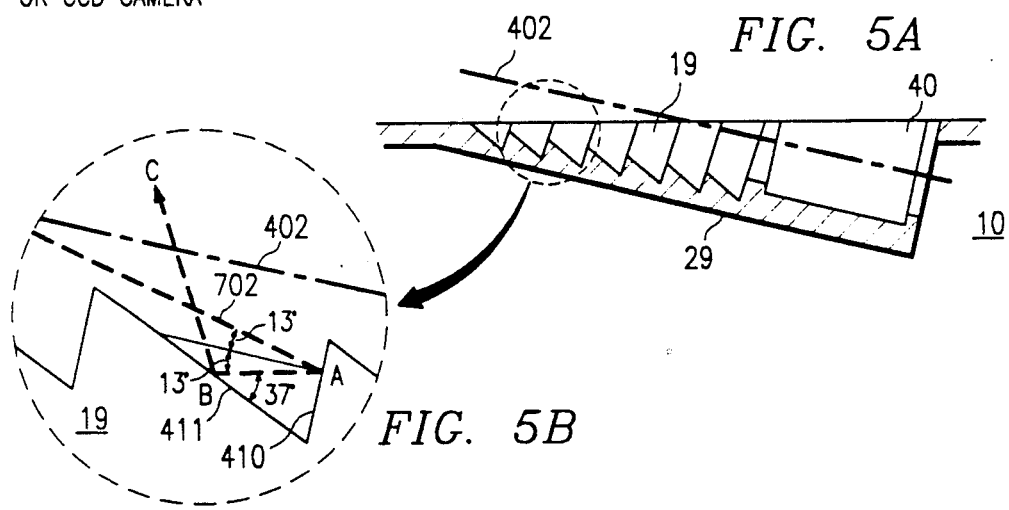
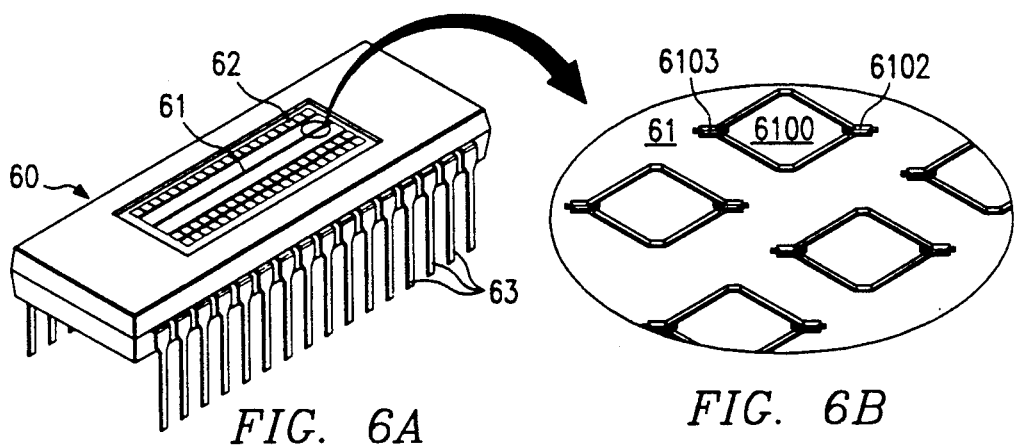

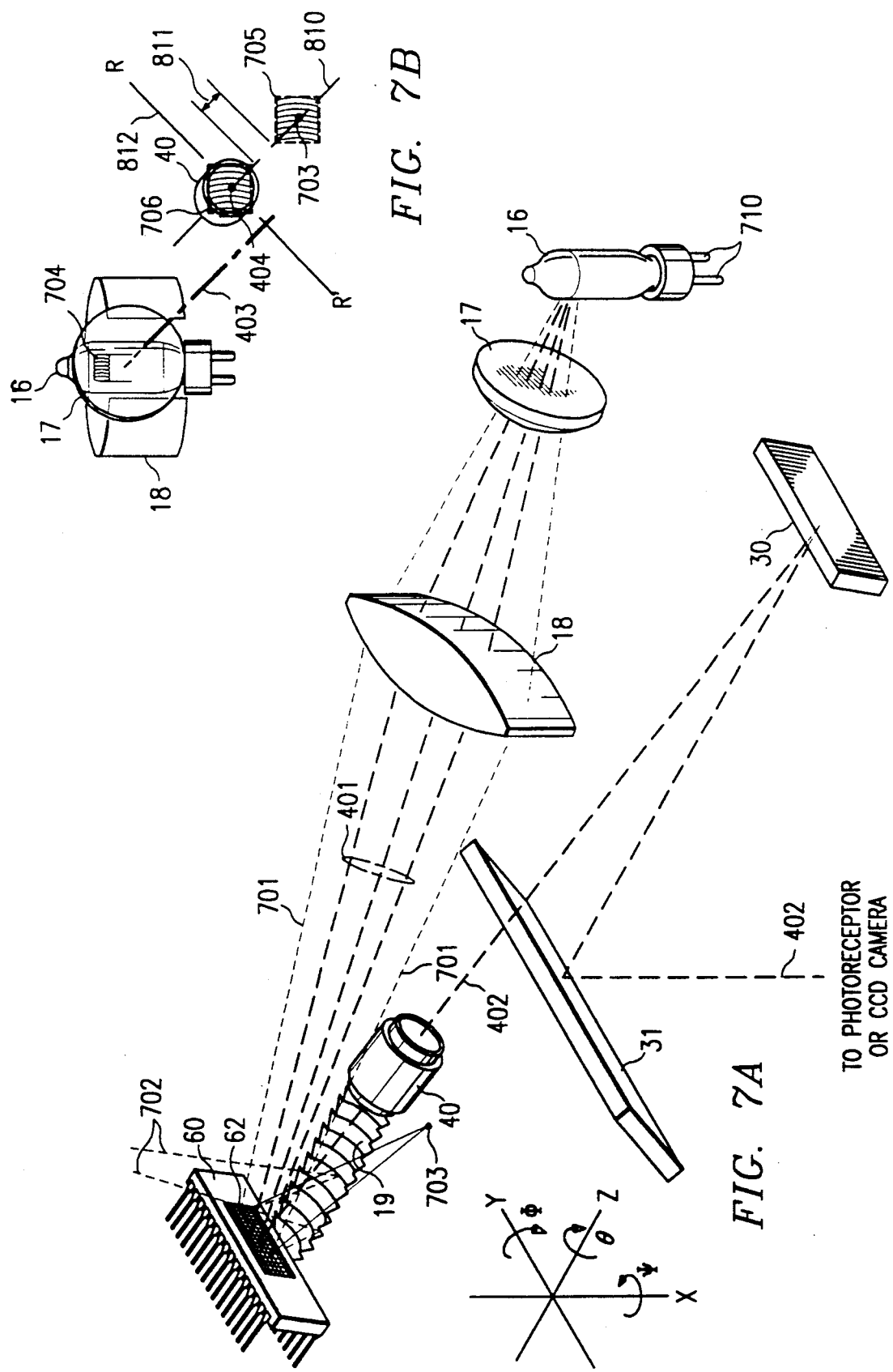

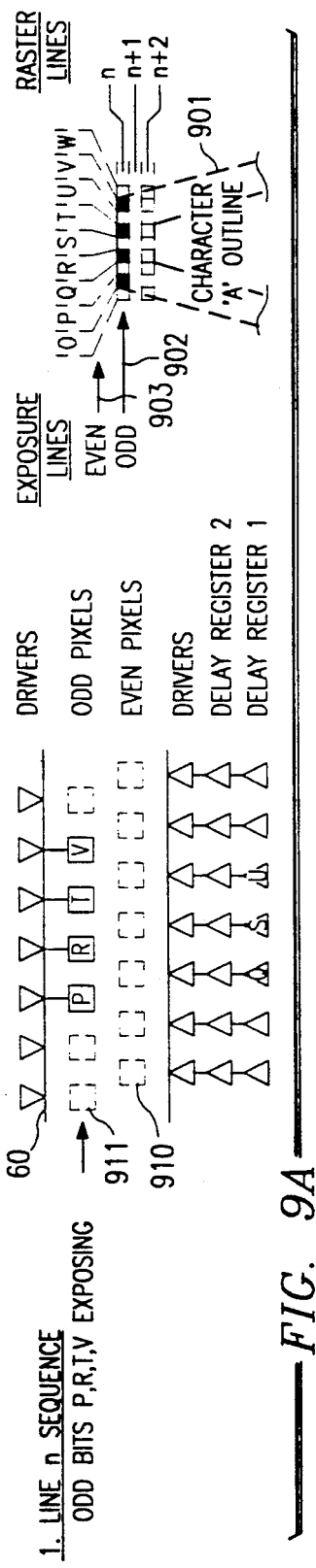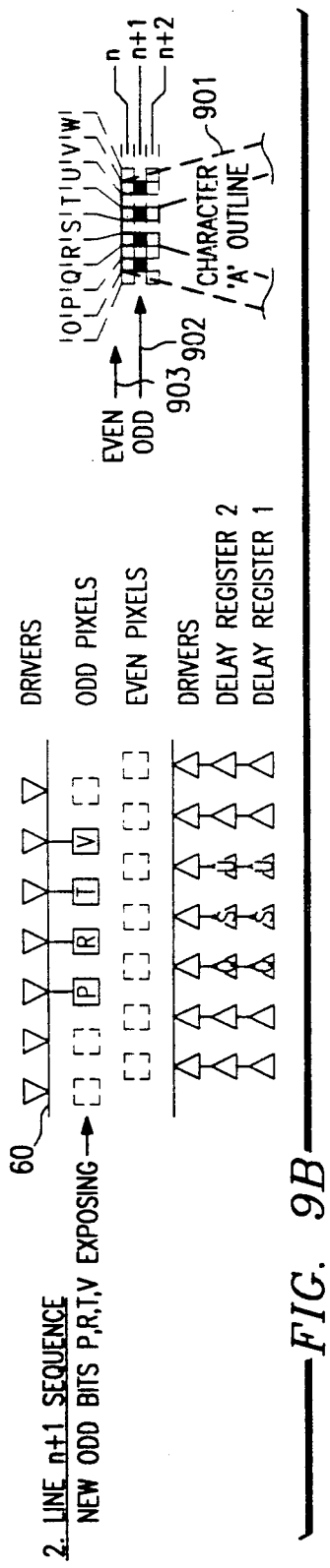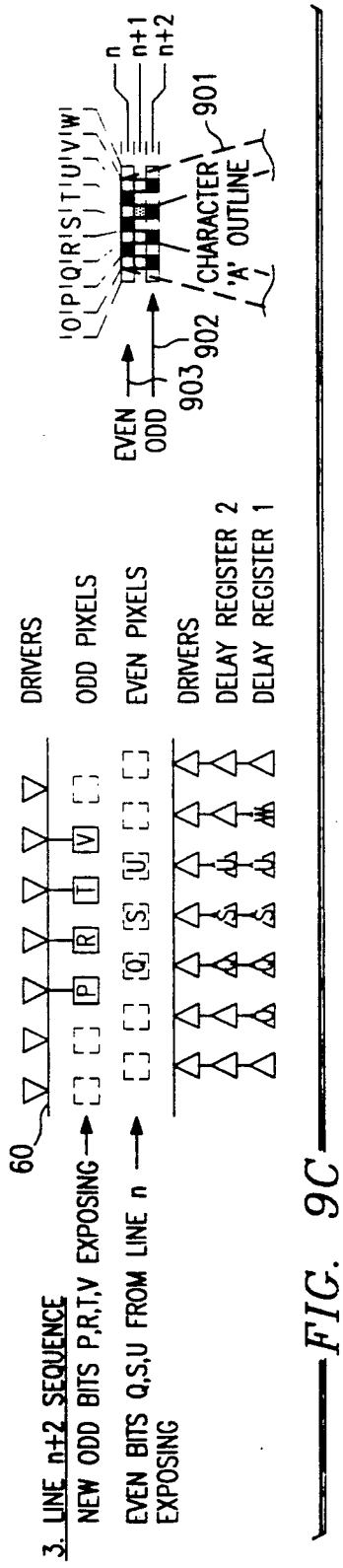

FIG. 10A

BOARDING PASS

FLIGHT  CLASS  DATE  TIME

GATE  SEAT  SMOKE

— — — — — — — — — —

PASSENGER TICKET AND BAGGAGE CHECK

ISSUED BY                DATE OF ISSUE

NAME OF PASSENGER

FROM

TO

RESTRICTIONS

FARE
TAX
TAX
TOTAL

FIG. 10B

BOARDING PASS

FLIGHT  CLASS  DATE   TIME
 350   COACH  9/29  10:37

GATE  SEAT  SMOKE
 18   14A   NO

— — — — — — — — — —

PASSENGER TICKET AND BAGGAGE CHECK

ISSUED BY TRAVEL AGENT   DATE OF ISSUE 7/21/89

NAME OF PASSENGER  JOHN DOE

FROM  HOMETOWN

TO    ANYWHERE

RESTRICTIONS  NON-REFUNDABLE

FARE  198.00
TAX    12.00
TAX    12.00
TOTAL 222.00

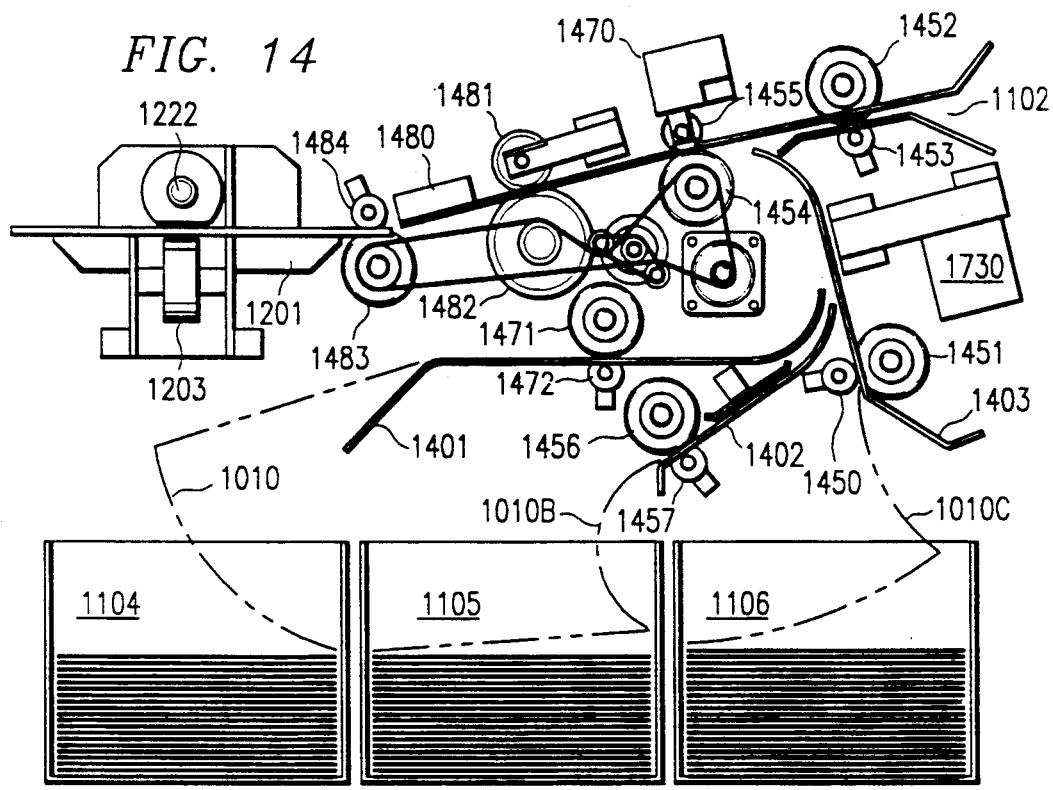
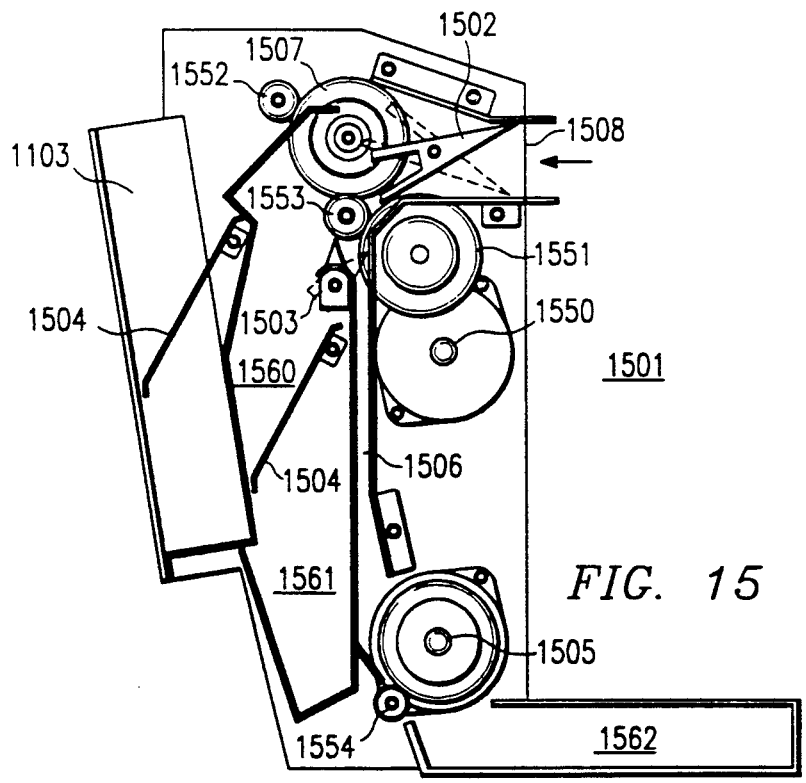

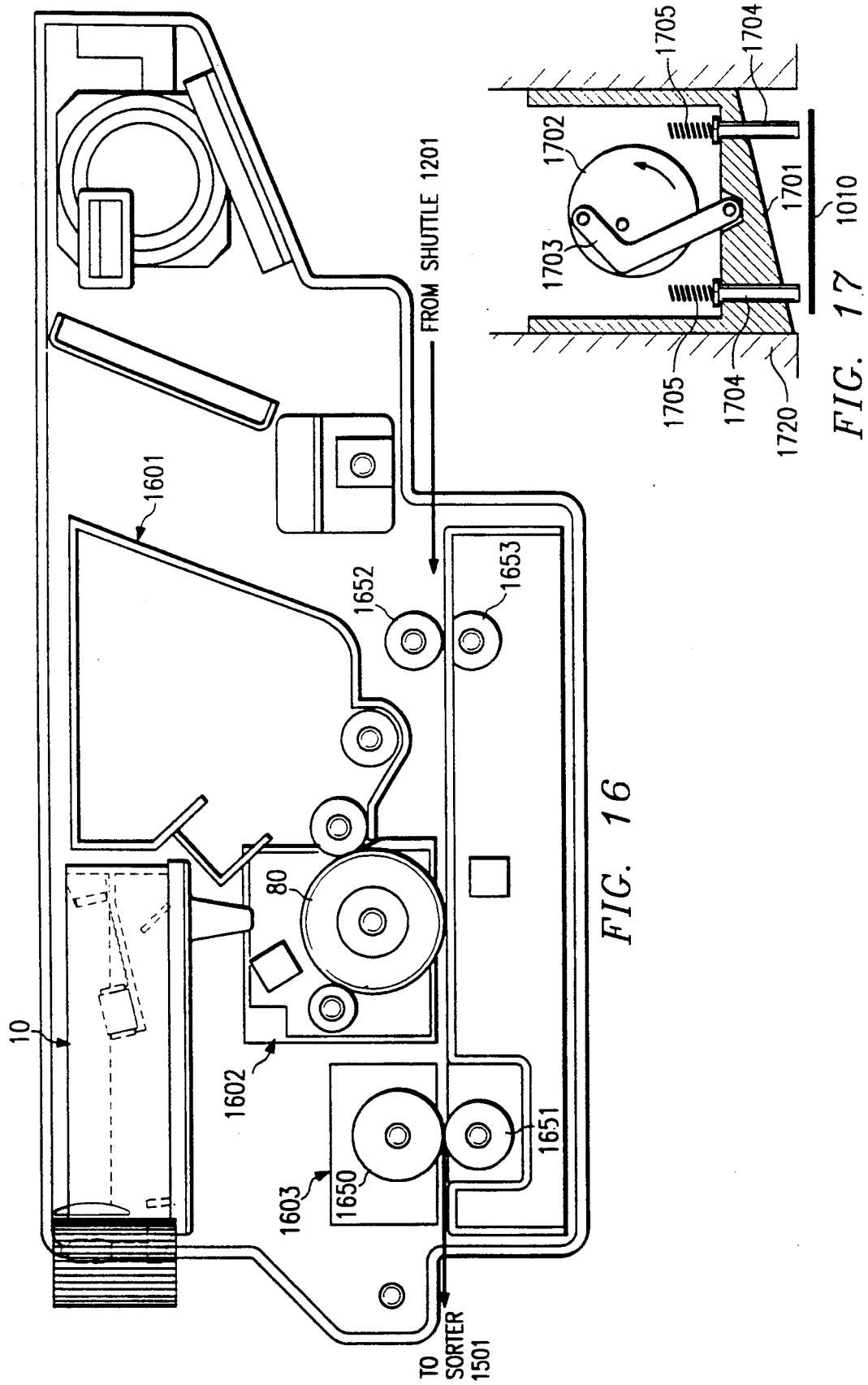

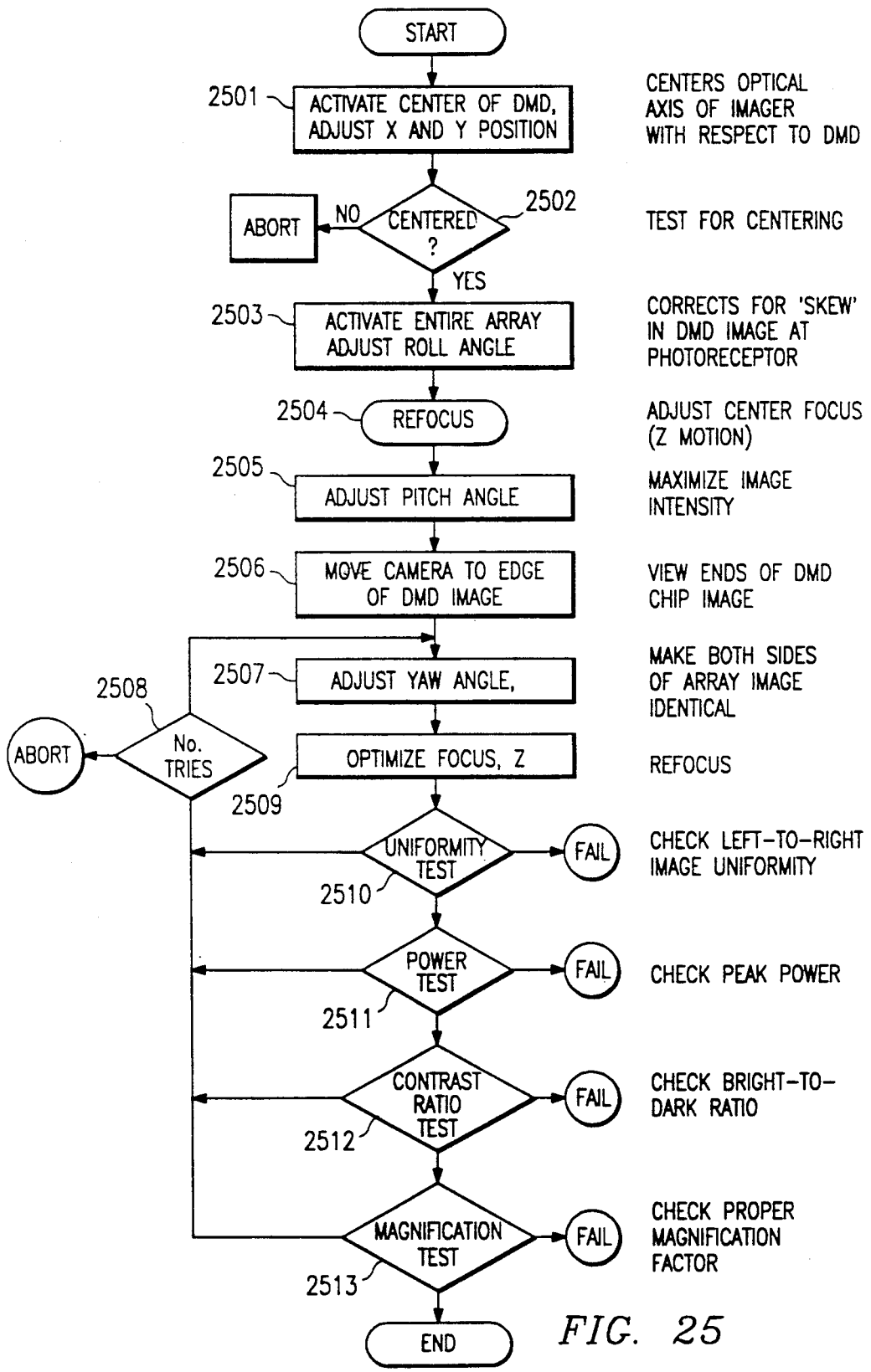

PRINTING SYSTEM EXPOSURE MODULE OPTIC STRUCTURE AND METHOD OF OPERATION

This application is a continuation of application Ser. No. 454,812, filed Dec. 21, 1989.

TECHNICAL FIELD OF THE INVENTION

This invention relates to printing systems and more particularly to such systems and methods using spatial light modulators, and even more particularly to the optic structure for processing light images in a spatial light modulator exposure unit.

RELATED PATENTS AND APPLICATIONS

All of the following patent applications are cross-referenced to one another, and all have been assigned to Texas Instruments Incorporated. These applications have been concurrently filed and are hereby incorporated in this patent application by reference.

| U.S. Pat. Ser. No. | |
|---|---|
| 454,568 | Spatial Light Modulator Printer and Method of Operation |
| 454,812 | Printing System Exposure Module Optic Structure and Method of Operation |
| 454,657 | Printing System Exposure Module Alignment Method and Apparatus of Manufacture |
| 454,566 | Spatial Light Modulator Exposure Unit and Method of Operation |
| 454,612 | Printer Having Separate Paper Handling and Printing Sections and Method of Printer Operation |
| 454,871 | Design for a Spatial Light Modulator Exposure Unit |
| 454,338 | System for Dynamic Toner Level Determination and Problem Indication and Method of Operation |
| 454,571 | Replaceable Elements for Xerographic Printing Process and Method of Operation |
| 454,205 | Light Energy Control System and Method of Operation |
| 454,869 | Design for Industrial Printer |
| 454,872 | Design for Replaceable Photoreceptor Cartridge |
| 454,494 | Design for Replaceable Developer Unit |
| 454,567 | Design for Replaceable Fuser Unit |

BACKGROUND OF THE INVENTION

There are numerous situations where it is important to control light energy and light transmission. For example, in a xerographic reproduction system, such as used in a printer, digital copier or facsimile machine, light from a source must be modulated into a series of dots (on and off conditions of the light) to form the image which is to be reproduced. The actual reproduction to the final media (typically paper) is accomplished through a light-sensitive photoreceptor in the form of a rotating drum, or belt, onto which the modulated light image has been transmitted. The drum is electrostatically dis-charged at the place where the light dots have exposed the drum so that charged ink particles, called toner, adhere to the drum at those places corresponding to the specific type of development process that is implemented. This toner is then transferred to the paper to create the final reproduced image.

In one system, it is desired to begin the process with an ordinary light source such as, for example, a tungsten halogen light bulb, and to reflect the unmodulated light rays from the light source off of a monolithic substrate which has built into it the ability to selectively reflect the light at particular locations on the chip. More specifically, the chip has on it at least one row of small deflectable mirrors which, when undeflected, reflect the light from the light source away from the drum. However, deflection of any, or all, of the individual mirrors causes the deflected mirror to image the light from that mirror location onto a corresponding position on the drum. At any one time, then, a group of deflections will cause an image of bright dots, called pixels, to be transmitted to the drum and ultimately printed onto the paper.

It goes without saying then that the ability of the system to accurately capture the proper reflected light and to reject all other extraneous light reflections is critical to the proper performance of the process. However, this is often difficult to accomplish, since stray light is particularly difficult to control. Compounding the problem is the fact that the light source must have enough energy to allow for all reflection and transmission losses. While theoretically, it is possible, problems still arise with the substrate mounting and alignment, and with the substrate itself which reflects light. Finally, the illuminating arm of the optics system must transmit a uniform irradiance profile to the modulator substrate to work properly.

One method of light control is to use baffles and light absorbing material. Thermal stress, however, can cause warping and other misalignment problems if too much heat, or IR energy, is absorbed by the various elements. Additional problems arise when it is desired to funnel the proper reflected, modulated, light dots to the drum and to mask all other light from the drum. This is because the ratio of modulated light to total light is relatively small ($<1\%$). Light absorbing and baffling problems are many faceted, and, if not carefully structured, will require complicated "tuning" and time consuming manufacturing techniques to achieve proper signal-to-noise ratios at the drum.

Since the modulated light must hit the drum in an exact pattern, and since all other light must be shielded from the drum, a system must be established which allows for the controlled disbursement of unwanted light rays and at the same time assuring precise handling of the proper modulated light signals. The system is further complicated by the fact that the modulated signals form a microscopically fine pattern that is changing extremely rapidly, on the order of 1720 times per second, and thus light paths must be closely controlled and repeatable. On the other hand, the stray light may continuously expose the photoreceptor surface over an area, or aperture, 25 times wider than the area exposed by the modulated pattern. Hence, a background wash of unwanted stray light at a very low intensity compared to the modulated signal can totally degrade the printed output. Because of the close tolerances, light divergences, which come about because of the turning mirrors in the transmission path, must also be controlled. All of these problems must be solved in an economical manner and without complicated alignment and trial-and-error light baffling techniques.

Thus, there is a further need in the art for such a system which allows for the control of the unwanted light energy without absorbing excessive heat, and without establishing complicated light transmission paths and precision component placement requirements.

SUMMARY OF THE INVENTION

A light energy control method and system has been created which allows for the control of the modulated and unmodulated light as part of the presentation of the light energy to a xerographic reproduction system. The xerographic system is broken into two parts, with the part which controls the drum and the actual paper reproduction called the reproduction unit and the part which controls the light modulation called the exposure unit.

The exposure unit is designed to mate with the reproduction unit such that the units can be manufactured separately. Alignment problems between the reproduction and exposure units are solved by using a three point attachment method and by properly aligning each exposure unit to these reference points during manufacture. In this manner, the exposure units are interchangeable, further adding to the flexibility and maintainability of the system The exposure unit is designed in the form of a box which fits on top of the reproduction unit. The bottom of the box is essentially sealed with a slot for mating with the reproduction unit. The modulated light passes through the slot and onto the drum of the reproduction unit. The coupling between the units can be flexible, as with the neoprene boot, to prevent dust and other particles from entering the unit and to maintain a tight light seal.

The exposure unit housing has constructed within it a partition which divides the box into a top section and a bottom section. It is the bottom section which communicates to the reproduction unit. The bottom section serves to accept modulated light from a focusing lens positioned in the top section. The light from the lens is then reflected through a series of mirrors bent downward to pass through the boot connection to the drum. In the preferred embodiment two mirrors are used.

The partition between the sections forms the base of the top section of the exposure unit. The top section contains a light source mounted at one corner to shield the unit from the lamp's heat while still accepting high energy light rays from a filament of the light positioned such that the light energy flows parallel to and above the partition. Mounted at the other end of the unit is the monolithic substrate containing the rows of the deformable mirrors. A holder is molded into the base of the top section for supporting the substrate across the width of the box. The substrate is positioned on its side so that it is held upright from the base, thereby allowing its front surface, which contains the individual mirror pixels, to be exposed to the light. Positioned between the light source and the substrate are optic lenses for directing the light onto the substrate. The light flows from the corner diagonally across the box and impinges upon the front surface of the substrate which is centered between the sides of the box.

An optical path is formed down the center of the box in the longitudinal direction of the light path. This light path is constructed to slope downward into the partition between the top and through which light modulated by the substrate is to pass. Fitted into this hole, and positioned within the sloping passage, is a focusing lens for accepting light reflected from the various deformed substrate mirrors and directing this light bundle onto a mirror located in the bottom section of the unit. Also located within the sloping passage on the top side of the unit and ahead of the focusing lens is a series of semicircular baffles constructed like a bee thorax, such that unwanted light reflecting from the substrate will reflect from the baffles back toward the substrate. This reflected light will be immediately re-reflected into a 45 degree angle such that it will go upward against the top surface of the unit to be absorbed by the top cover.

Accordingly, it is a technical advantage to arrange a xerographic exposure module with a deformable mirror device having a light source integral to the module. It is a further technical advantage to arrange the deformable mirror device to be removable and adjustable with respect to the module housing.

It is a still further advantage to arrange a deformable mirror device to perform light modulation in a self-contained module having a light source and a series of focusing/imaging lenses, and wherein the deformable mirror device contains a row of elements having more individual elements than are actually required for each modulated row, thereby allowing for easier alignment of the elements within the exposure unit.

It is a still further technical advantage to arrange a spatial light modulation device for use in an exposure unit of a printing system, where the exposure unit includes a source of light separately positioned with respect to the modulation device such that unmodulated light from the source falls upon the device and where the exposure unit has a focusing apparatus for accepting light selectively reflected from certain pixels of the modulation device.

It is a still further technical advantage to arrange a modulation device as discussed above with a plurality of pixel elements formed in a substrate, each pixel being electrostatically deflectable, and where the device also contains addressing circuitry formed in the substrate, and operable upon receipt of a data signal addressed to a particular pixel for enabling the deflection of the addressed pixel, such that light, which otherwise would be reflected by the pixel away from the focusing apparatus, is instead reflected to the focusing apparatus, and where the device contains mounting supports for removably attaching the reproduction unit to the exposure unit.

It is a still further technical advantage to provide a spatial light modulator device in conjunction with an optical axis down which modulated light passes unobstructed to an imaging lens while remodulated light is reflected off-axis and where there is a dead-band between the on-axis and off-axis light rays.

BRIEF DESCRIPTION OF THE DRAWINGS

For a more complete understanding of the present invention and further advantages thereof, reference is now made to the following Detailed Description, taken in conjunction with the accompanying Drawings, in which:

FIG. 4 is a right side view of the exposure unit taken along line 4—4 of FIG. 2;

FIGS. 5A and 5B are views of the bee thorax portion of the exposure unit also taken along line 4—4 of FIG. 2;

FIGS. 6A and 6B are perspective views of the deformable mirror device (DMD) used in the exposure unit;

FIG. 7A and 7B are schematic views showing the optic path of the exposure unit;

FIG. 9A, 9B and 9C show details of sequential printing of even and odd pixels for a two row DMD;

FIGS. 10A and 10B show an example of coupon printing stock and printing thereon;

FIG. 14 shows details of the multiple stock feeding

FIG. 15 shows details of the sorting mechanism used control the output of the printing system;

FIG. 16 shows details of the xerographic printing drum module, toner/developer module, exposure module and fuser module;

FIG. 17 shows details of the burster mechanism;

FIGS. 22-25 show a system and procedure for controlling a positioning device in a manufacturing process;

DETAILED DESCRIPTION OF THE INVENTION

For a more complete understanding of spatial light modulators, reference is made to U.S. Pat. No. 4,596,992, issued Jun. 24, 1986; U.S. Pat. No. 4,662,746, issued May 5, 1987; and U.S. Pat. No. 4,728,185, issued Mar. 1, 1988, all of which are hereby incorporated by reference herein. Aforementioned U.S. Pat. No. 4,596,992 also discusses the use of a deformable mirror device (DMD) in a printer.

Exposure Unit

Figure 1:
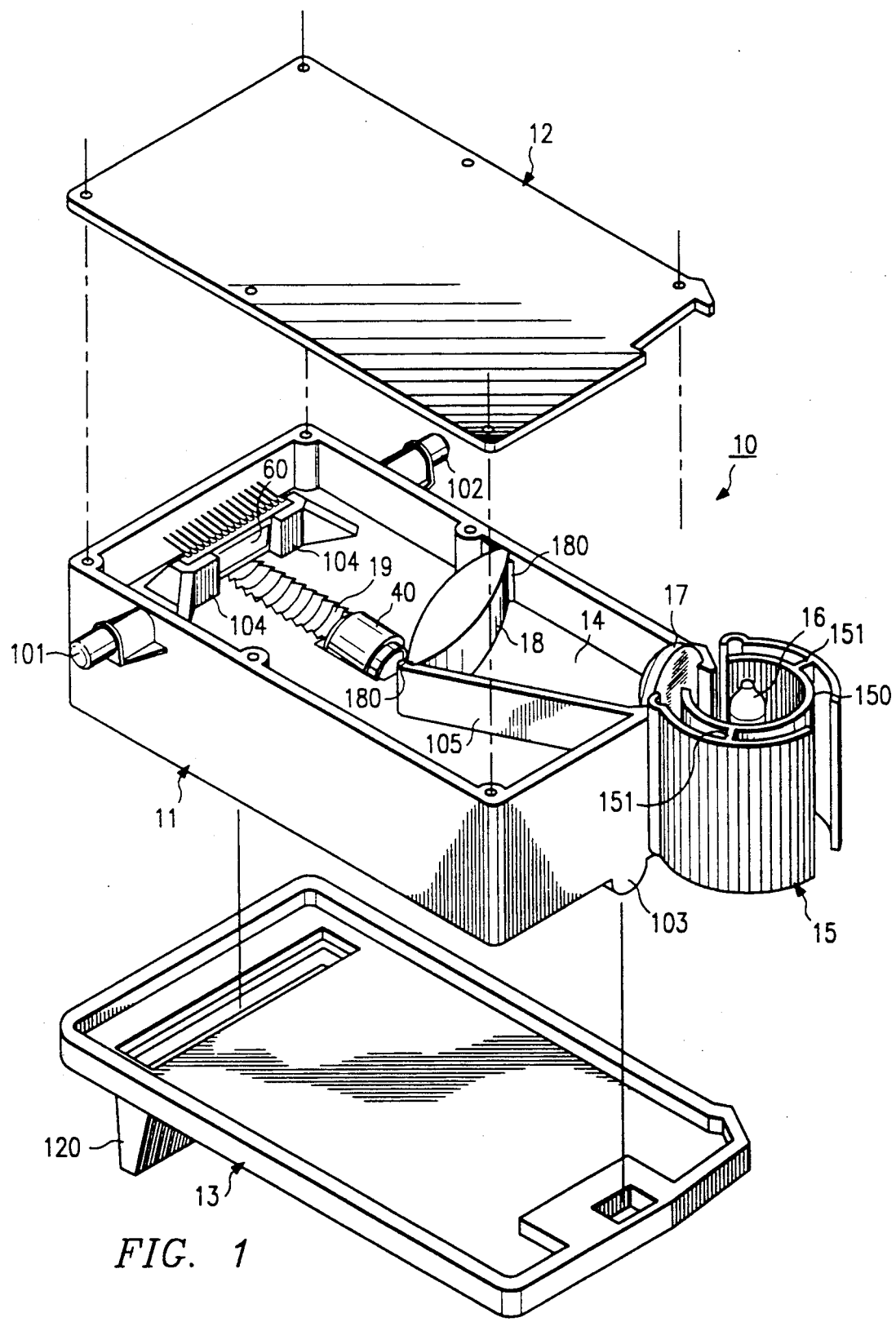
FIG. 1 is a perspective exploded drawing of the exposure unit of a printing system.

Turning now to FIG. 1, there is shown an exploded view of exposure unit 10 used to create modulated light images which in turn can be used, for example, in a xerographic reproduction system. The exposure unit consists of housing 11 constructed of a low coefficient of expansion material such that the heat generated by illumination source 16 will not cause an appreciable stress inducing movement in the structure thereby insuring that the optics of the device remain positioned within tight tolerances. To this end, light source 16 is outside main structure 11 and contained by double chimney 15 having an inner wall 150 separated from an outer wall 15 by radial spokes 151. Inner chimney 150 can be made of a material, such as aluminum, which absorbs heat and transmits the heat through spokes 151 to outer wall 15 which can be made of ribbed aluminum to dissipate the heat. Chimney 150 can be anodized black to increase absorption and reduce reflected light.

Figure 2:
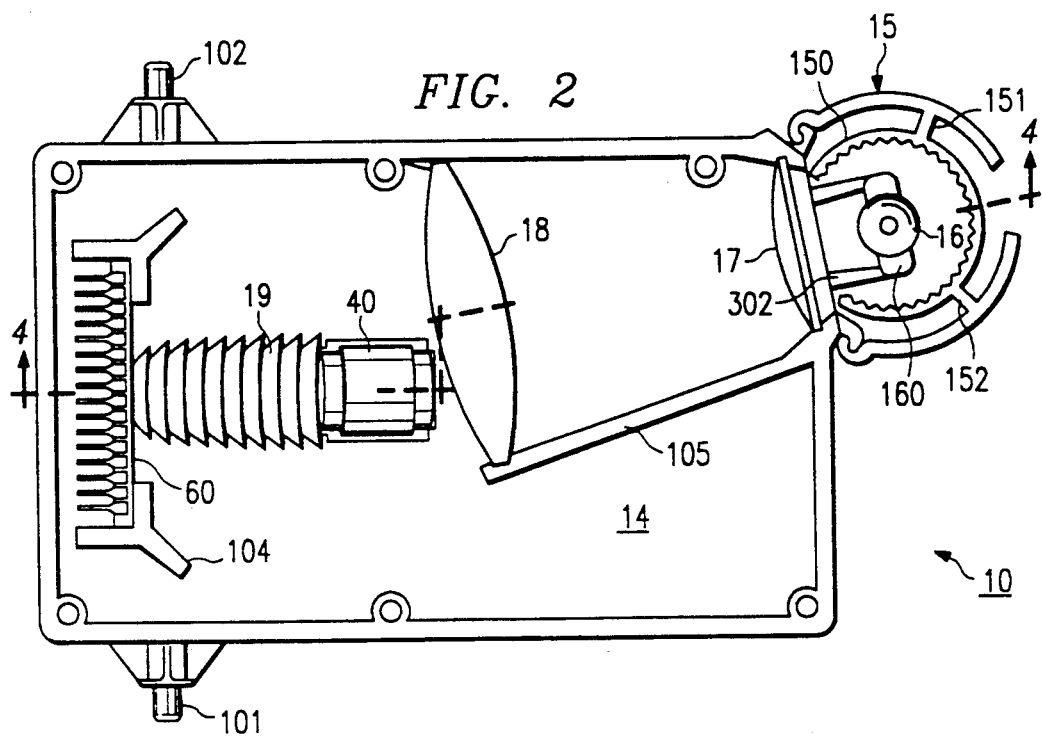
FIG. 2 is a top view of the exposure unit.

Structure 15 is connected to housing 10, using thermally isolating bonding material. The purpose of attaching lamp 16 to the housing is so that the filament of lamp 16 remains lined up perfectly with the internal optics path regardless of movement of the housing. This is assured by the precision molded lamp socket 160, which registers the lamp filament to the optics path by exact positioning of lamp pins 710 (FIG. 7A) in lamp socket 160 (FIG. 2). The tungsten halogen lamp is a commercially available "instrumentation lamp". These precision lamps have the filament pre-aligned to the ceramic base and the lamp pins; therefore, no adjustment of source 16 with respect to exposure unit 10 is required during assembly. At the same time by virtue of heat sink 15 and external source mount 302 (made of a low thermal conductivity plastic) source 16 does not transmit heat to the housing to cause thermal problems within the housing. Air is forced through chimney 15 from the bottom to the top which serves to cool bulb 16 uniformly around the bulb. This reduces the possibility of the bulb developing white (opaque) surfaces from uneven cooling, thereby giving maximum longevity to the exposure unit.

As will be seen, exposure unit 10, which has a horizontal internal partition, or base 14, is designed to mate with the xerographic printing unit (shown schematically in FIG. 18) by tabs 101, 102 and 103, which effectively provide a three point mounting so that exposure module 10 can be perfectly and easily positioned optically with respect to the printing unit. The exposure unit is then fastened, by spring snaps or otherwise, to the printing unit, to form an operationally functional mounting.

Digressing momentarily, it might be helpful at this point to understand the optical path and propagation path of light rays through the exposure unit. Such propagation begins with illumination from bulb 16 focused through lens 17 and through lens 18 onto deformable mirror device (DMD) 60. At this point the light is unmodulated. DMD 60, as will be seen, reflects the light into two distinct bundles, a modulated bundle going into an imaging lens and an unmodulated bundle that is reflected away. The beam going into the imaging lens goes down through base 14 and imager lens 40 and thence via a folded path, comprising a set of mirrors, to a funnel structure 120 in the base of exposure unit bottom cover 13. The light image, which consists of a pattern of modulated light dots, then impinges upon a xerographic drum, as will be seen hereafter, to create an exposed image which is then developed and printed by a xerographic process.

Returning now to FIG. 1, illumination source 16 advantageously can be a tungsten halogen bulb, such as the General Electric single-ended quartzline ® photo lamp series. The source is selected to provide the required lifetime (typically 2000 on-hours), and a power level suitable to the print process exposure requirements. The light from bulb 16 is focused by a heat resistant spherical lens 17 onto lens 18 which serves to direct the light onto DMD 60. Lens 18 is mounted on a molded-in precision pivot point positioned in the lower flat surface at the longitudinal center line. The ends 180 of lens 18 are held in slots in inner wall 105 and in the outer wall of exposure module 10. These slots allow lens 18 to expand along its longitudinal axis. However, since lens 18 is mounted on a center pin (not shown), the focal distance does not change, and, therefore, the light remains uniformly directed onto DMD 60. Lenses 17 and 18 together comprise a condenser assembly. The function of this lens group is to provide uniform illumination at DMD 60, and also to provide a focused and magnified image of source filament 16 which is formed in the front plane of imager lens 40.

Lens 18 is center pivoted and allowed to be free on the ends because the plastic material from which it is molded has a high thermal expansion as compared to the thermal expansion of exposure module 11. Lens 18 has a complex aspheric surface design, and must therefore be molded to reduce the manufacturing costs of lens 18. On the other hand, lens 17 can be made out of a low coefficient of expansion material such as pyrex and thus, can be mounted rigidly if so desired.

As will be seen, DMD 60, which is held approximately perpendicular to base 14 by mountings 104, is operative upon electrical signals being applied to selected mirrors to cause light modulated by those mirrors (pixels) to go directly dow an optical axis and be focused by imaging lens 40. The light from unmodulated mirrors, or from the nonactive surface of DMD 60 is scattered by the operation of thorax 19 which is positioned at least partially circumferentially around the optical axis.

Top 12 is constructed such as to have a dimple (not shown) on the inside surface thereof to hold the top of lens 18 in position. Top 12 in an alternative embodiment, may also be arranged with a canopy designed to fit over lens 17 to hold lens 17 in position. Alternatively, one or both of these lenses can be cemented into position using a high temperature compliant bonding agent.

Base 13 fits on the bottom of exposure module 11 and contains funnel 120 for containing light images from the exposure module to the optical receptor, as will be seen. Baffles inside funnel 120 serve to reduce reflections and stray light so as to maintain a high degree of contrast in the final printed image.

Figure 3:
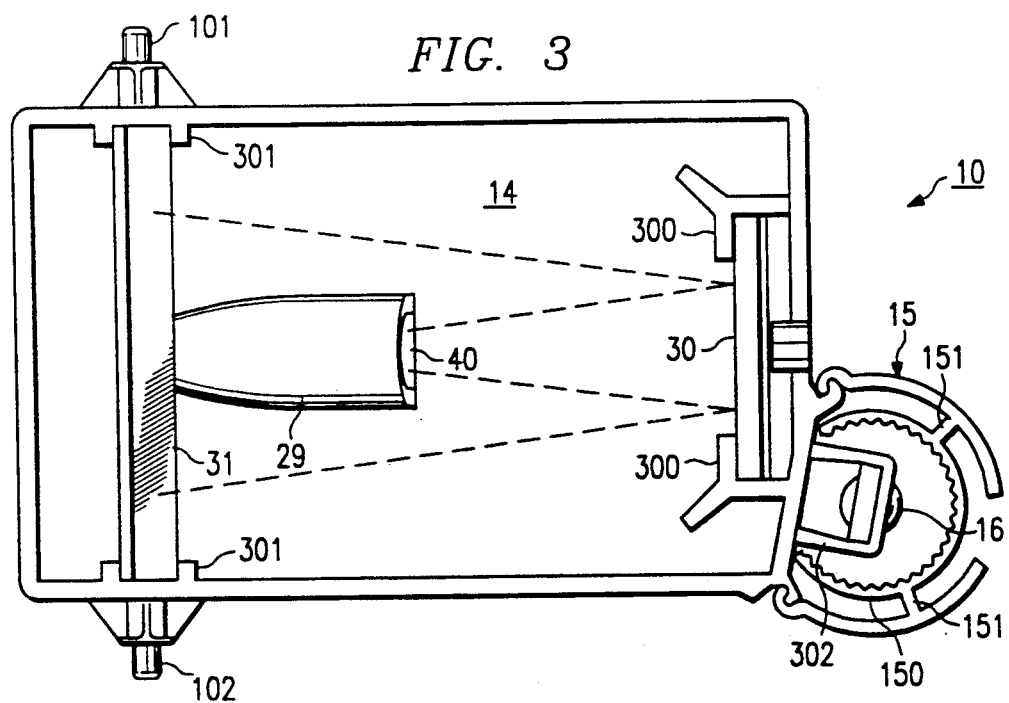
FIG. 3 is a bottom view of the exposure unit.

Turning now to FIG. 2, there is shown a top view of exposure module 10. Not shown is the cable which would connect DMD 60 to a source of electrical modulation signals and also would connect lamp 16 to a source of power. This cable can advantageously be run inside exposure unit 10 and exit on the side closest to wall 105. Socket 160 which holds bulb 16 can advantageously be molded into a structure supported and referenced to exposure unit 10 by arms 302 for reliable precise optical alignment. Support brackets 104 which hold DMD 60 can be molded directly into partition 14, which partition serves to separate exposure unit 10 into an upper unit as detailed in FIG. 2 and a lower unit as detailed in FIG. 3. Channel 19 is positioned on the optical axis of modulated light reflected by DMD 60 between the upper and lower sections and extends through partition 14. The saw-tooth or bee thorax shape is formed semicircularly around the modulated light axis and, as will be seen, serves to deflect and absorb the light from the unmodulated pixels and other structures of DMD 60. Channel 19 is constructed to hold image lens 40 whose purpose is to take the light which is reflected from the modulated mirrors of DMD 60 and to focus the light, via the optical path formed by a set of mirrors 30, 31 (FIG. 3) onto the xerographic drum below boot 120 (FIG. 4).

Protrusion 29 (FIG. 3) forms a semicircular channel for construction (on the top side) of the bee thorax.

Turning now to FIG. 4, there is shown a sectional view of exposure unit 10 taken along section 4—4 of FIG. 2. FIG. 4 shows light rays 401 in the upper section where the light leaving bulb 16 is focused through lens 17 and through lens 18 onto DMD 60. Light rays 402, as modulated from DMD 60, pass through imager lens 40 onto mirror 30 in the bottom section of exposure unit 10 and from mirror 30 to mirror 31 which turns the image 90 degrees allowing the image to exit through funnel boot 120, and proceed onto the photoreceptor surface of the xerographic printing device. Within boot 120 there are a series of steps or light baffles 41 which prevent the scattered light from lowering the contrast on the reproductive drum, and a transparent cover 42 used to seal the exposure unit.

FIG. 5A shows channel 19 which is constructed along the optical axis of light path 402 and constructed as a series of steps in the form of a bee thorax. Light rays 702 reflected from the pixels which are not selected are deflected out of the true optical axis approximately 10 to 15 degrees, and hit one of the walls of the thorax and are attenuated and bounced back from the wall against another wall and upward to further attenuate on the top cover of the exposure unit. In this manner, the reflected light from the unselected pixels is effectively separated from the light reflected from the selected pixels, thereby causing beam 402, as applied to imaging lens 40 to contain only modulated light. Thus, only reflections from the imaged or modulated pixels are contained in beam 402 as it is focused through image lens 40. Bee thorax 19 thus serves as a series of light baffles which are in the optical path of the unmodulated beam 702, and which serve to attenuate the unselected light. The construction of bee thorax 19 is such that it is semicircular around the optical axis with walls perpendicular to the axis. The base of each wall is connected to the top of the preceding wall by a sloping surface (saw tooth). It is this sloping surface which re-reflects the bouncing light away from the optical axis, directing it nearly perpendicular to the optical axis 402 and thereby assuring a very high rejection ratio at imager lens aperture 40.

FIG. 6A is a view of DMD 60 which has sections of address structure 62 built into the silicon as well as one or more rows of pixels 61 designed to allow light to be deflected, and resulting bright (and dark) images formed, depending upon the electrical selection and modulation (or non-modulation) of any one of the pixels. The squares 62 shown in DMD 60 are representative of the silicon address structure. The individual pixels, which in actuality would measure 19 microns square per pixel, are represented as a fine line 61 down the center of the otherwise featureless central mirror structure. This essentially specular mirror surrounding the actual DMD pixels performs the function of directing the relatively large portion of the illumination falling onto the DMD, but not onto the pixel elements, into the unmodulated filament image which is intercepted and attenuated by bee-thorax 19. If the surrounding surface were not a mirror, but had structure (like the outlying address circuit), it would re-radiate the background illumination isotopically rather than into an image of the source filament. It could then enter imager 40 and degrade the contrast at the DMD image formed at the photoreceptor drum. DMD 60 is shown with terminals 63 for receiving internal modulation and control signals from a computer or other source.

FIG. 6B shows a blow-up of a few pixels 6100 from Line 61 of FIG. 6A. As shown, the pixels are hinged on their corners 6102 and 6103 which then establishes the light path from above and reflected below the horizontal. This, of course, is but one embodiment and others could also work. The actual operation of the pixels is discussed in the above-mentioned patents. Movement of the pixels creates an on-state and an off-state of the modulated light.

Optical Modulation Path

In FIG. 7A, there is a schematic view of light rays 401 emanating from bulb 16 and condensed via lenses 17 and 18 so as to substantially illuminate the active pixel area of DMD 60. By far however, the vast majority of light from source 16 falls on the mirror surface surrounding the active rows 61 of DMD pixels. This is indicated by light rays 701, and also includes most of those rays that lie above or below the plane of rays 401 and 701, but which are not shown for clarity. Were it not for the light reflecting function of the bee-thorax 19, these rays would reflect from the flat surface (and unmodulated pixels) of DMD 60, and come to focus in space around point 703. Point 703 is the center of an image of the filament of source 16 that would be formed in the plane of imager lens 40 entrance aperture were those rays not diverted by the action of bee-thorax 19. Rays 702 are thus shown to be diverted from point-of-focus 703 by bee-thorax 19 and propagate away nearly orthogonal to the main optical axis lying along ray 402. The light energy in the unmodulated filament is several orders of magnitude larger than the light in the modulated filament image that impinges on the imager lens 40, along path 402. The high selectivity of the dark-field projector apparatus as discussed in U.S. Pat. No. 4,728,185, arises from the recognition and use of the fact that the unmodulated light comes to a focus in the immediate vicinity of point 703. Thus, point 703 can be made to lie entirely outside of the entrance pupil (aperture) of imager 40 by suitably orienting the optical axis of the condenser system, 17 and 18, and source 16.

FIGS. 1, 2 and 7A show the optical axis of the condenser lying to the left (viewed from DMD 60) of the optical axis of the combined DMD 60 and imager 40 arm of the optics train. In FIG. 4, it is further revealed that the condenser optical axis, lying along ray 401, is also above the optical axis of imager 40 which lies along ray 402. From these two offsets, it is evident from the law of reflections that the filament image formed by light reflected from the planar mirror surface of DMD 60 (and any unmodulated pixels) must reside below, and to the right, of imager 40 as viewed from DMD 60, in other words at point 703, FIG. 7A.

Simply directing the unmodulated energy away from the imager pupil does not guarantee the high contrast ratio at the DMD image required for printing. The efficient action of bee-thorax 19 to deflect the unmodulated energy away from the imager lens, and to absorb much of it with at least two deflecting surfaces (FIG. 5) is important to the operation of the exposure module. A featureless channel (without reflective surfaces) would allow unwanted light into the imager lens through the mechanism of grazing reflection. The design of bee-thorax 19 provides a very highly attenuating light path that requires no alignment and can be built from conventional molded plastic material, adding virtually no cost to the exposure module.

Further details of this highly selective optical arrangement are shown in FIG. 7B which views the optical arms of condenser 18 and imager 40 as seen from the perspective of DMD 60.

As shown in FIG. 7B, the background light (unmodulated rays) from condenser system 16, 17, 18 aligned with axis 403 converges into hypothetical filament image 705 at point 703 (FIG. 7A). Image 705 does not exist in the actual exposure module because of the reflective (attenuation) action of bee-thorax 19. However, when any DMD pixel 61 is rotated in the selecting direction about its hinge axis RR, 812, a full image of source filament 704 translates from image position 703 to image position 706.

Filament image 706, as produced by the rotation of a single DMD pixel is, of course, exceedingly dim due to the small amount of energy modulated and the large area of the filament image, corresponding to an area ratio of pixel to image of several hundred. However, when imager 40 collects the light bundle impinging on the front aperture, and refocuses it into an image of the respective pixel at the photoreceptor surface, the image is quite bright.

The action of DMD 60 to modulate light energy, and the significance of the term spatial light modulator (SLM) is thus revealed. The rotational action of the individual DMD pixels serves to spatially modulate a small amount of energy from image position 703 to image position 706. At the photoreceptor, however, because of the fixed focus of imager 40, there is no spatial movement of the corresponding DMD pixel image. The observed property is that of a series of fixed spots (or pixels), any one of which simply becomes brighter or dimmer. A helpful analogy is to consider the situation where a hand-held mirror is used by, for example, a shipwreck victim in a raft, to signal to an airplane overhead. By deflecting (or steering) a beam of collimated light from the sun, into the pupil of the pilot's eyes, a very bright image is received by the retina. The sun being the source, the mirror the DMD pixel, the imager 40 equivalent to the pupil of the eye, and the retina equivalent to the photoreceptor, the analogy is established.

It is significant in FIG. 7B that the DMD pixel rotation axis RR' 812 is perpendicular to the line of motion 810 of the image. By the law of reflection, a beam of light is diverged by twice the angle the mirror surface is rotated. Hence a rotation about RR' of a reflecting element at the DMD necessarily moves a light bundle along line 810. If condenser assembly 16, 17, 18 were situated at any other angle with respect to the DMD so that unmodulated filament image 705 did not center on line 810, then the modulated filament image 706 would likewise not center on the imager 40 at point 404. As a result, less than the full amount of available energy would pass through the imager, and full photoreceptor exposure efficiency would not be achieved. It is also implicit that the rotational angle designed into the DMD 60 must correspond to the offset angle of the condenser system axis 403 such that image 706 is centered on imager 40 when a DMD pixel 61 is actuated. For similar reasons to the preceding discussion, power throughput would be otherwise reduced.

By design, the condenser system optics 17, 18 is chosen to magnify filament 704 so that resulting image 706 overfills the imager aperture 40. The condenser collection efficiency increases with magnification factor. The outer edges, and especially the corners of the filament image are less optically efficient radiators than the central region hence it is not critical that they lie in the imager aperture. Finally, the most efficient optical system is one wherein the full cone angle of the imager is utilized. Maximum pixel image brightness at the photoreceptor occurs when the filament image completely fills imager aperture 40. These conditions are assured by choice of source 16 filament size and shape (nominally square) combined with condenser 17, 18 magnification factor, and finally the size of imager aperture 40.

From the preceding comments, it may seem that the larger the imager aperture (e.g. faster imager lens or lower f-number), the more optically efficient the system. This is not the case. Aside from the desire for a compact exposure module system, the cost of faster imager lenses increases dramatically. The existing system serves to expose a xerographic process operating at a speed of 7 inches/sec. (or 42 coupons per minute) using a 120 watt source and an f 4.5 imager. The latter is a very compact, economical lens to manufacture. The limiting factor on imager lens 40 aperture is determined by optical system design considerations that, when combined, are manifest simply as the size and separation of the two filament images 705 and 706.

The separation is shown as 811 in FIG. 7B. The separation is referred to as "dead-band" in the nomenclature of the dark-field optics system as discussed in the aforementioned U.S. Pat. No. 4,728,185. Physical significance of the dead-band arises from the fact that it guarantees that no portion of unmodulated light energy in filament image 705 even approaches the imager aperture. Recalling that the relative intensities of the two images differ by orders of magnitude, reflecting the relative illuminated areas of the DMD, it is clear that even if the corner of image 705 resided in the aperture of imager 40, the contrast ratio at the photoreceptor would be substantially impaired. By building in an intentional "dead-band", some tolerance for system misalignment is accommodated. Further, if over the course of many operating cycles, the DMD pixels should take a permanent "angular-set", even to the extent of one or two degrees from flatness, they would still not introduce any energy into imager lens 40 by virtue of the dead band. Lastly, if due to optics misalignment, filament image 705 were blurred or distorted to a larger than normal size, energy would not enter imager lens 40.

The dead-band concept, therefore, provides a considerable latitude in the system assembly and optical tolerances, while yielding high performance contrast ratios at the photoreceptor image, in excess of 100:1.

FIG. 5A shows bee thorax 19 which is a series of saw tooth profile steps, 410, 411, concentrically formed around a semi-circular (or full circular) bore fashioned in the base of exposure module 10. The shape of the concentric circles allows for easy molding of the light baffle. Unwanted light from DMD 60 (referred to as "off state" light), strikes first surface 410, as seen in FIG. 5B, of one of the series of concentric baffles forming the saw tooth profile. This first collision labeled "A" is at a particular angle (the one shown is approximately 13 degrees) to force the reflection of the off state light into back face 411 of the saw tooth profile causing collision "B". This secondary surface forms an undercut or negative rake and is of a particular angle to force the light into the upper roof of the light module causing collision "C". Since all of the collision surfaces "A" through "C" can be blackened, the result forces the unwanted light to strike three blackened surfaces before allowing it to strike any uncontrolled surface, thereby virtually absorbing all of the undesired light.

Reproduction Unit

Figure 8A:
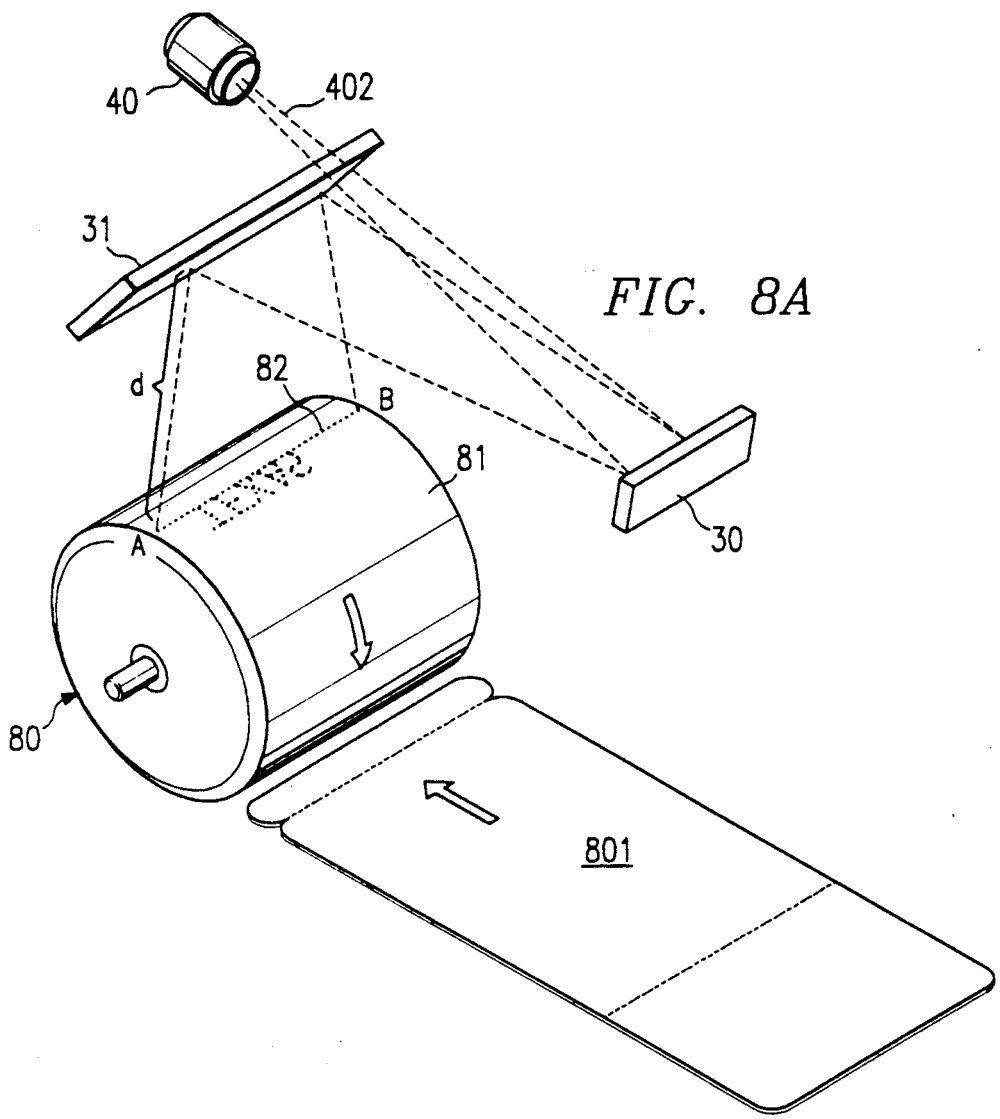
FIGS. 8A and 8B show the interaction of the optic path with a xerographic printing drum.

Continuing now in FIG. 8A, the modulated image of pixel dots 402 from lens 40 is focused, as above discussed, onto xerographic printing drum or surface 81 of drum 80. This projection is in a line 82 across surface 81 and contains one or more rows of the modulated dot pattern which will form the printing on printing stock 801 which passes under drum 80 in the direction shown. While only a single row of dots are shown in FIG. 8A, two such rows (as will be detailed) are actually placed on the drum at one time.

Figure 8B:
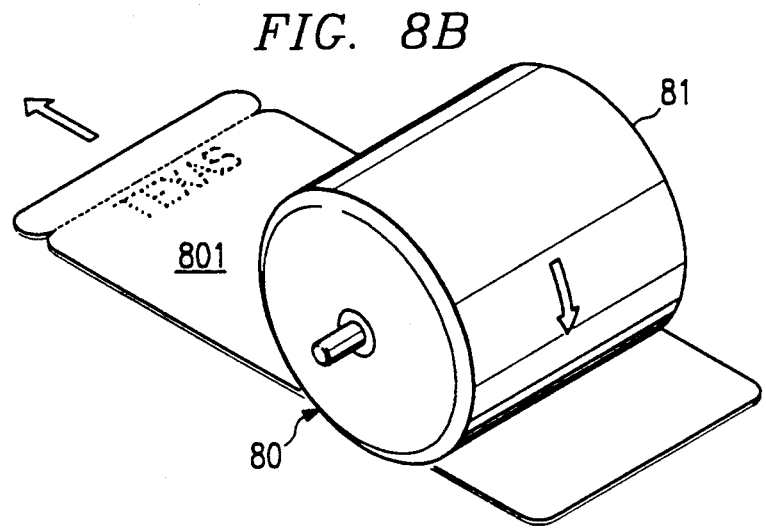

As will be detailed more fully hereinafter, toner is applied to drum surface 81 and adheres to the spots where the modulated light impacts the drum. This toner, in turn, is transferred to coupon stock 801 in the well known xerographic process. Line by line, the modulated light places closely spaced dots on drum 81 as the drum rotates. This rotation eventually causes the printing process to take place as shown in FIG. 8B. While the drum is shown advancing with no further modulated dot patterns on surface 81, this is shown only to make it easy to visualize the process. In fact, in actual practice, contiguous rows of dot patterns would be deposited under control of exposure unit 10 in order to have a continuing printing process.

FIG. 10A shows blank coupon stock 1010 containing some preprinted information thereon. FIG. 10B shows stock coupon 1011 after it has passed under xerographic drum 80 and after information has been printed thereon by the series of dots which had been transferred to drum surface 81 by modulated light 402, as previously discussed.

As discussed previously, light rays are modulated by DMD 60 (FIG. 8A), which device can be formed having a single row of deformable mirrors or multiple rows of such mirrors. In a preferred embodiment, two rows of mirrors are used, and therefore, two lines of dots are placed on drum 81. The even and odd bits (pixels) of two rows are, in reality, a single row from a character. The bits from the odd and even rows are spaced apart a fixed distance representing the physical distance between the mirror rows of DMD 60. The utilization of two rows of mirrors can provide higher print resolution of the dots because the offset rows can be made to optically overlap each other as illustrated in FIGS. 9A, 9B and 9C. This overlap lies along the DMD axis, and corresponds to the fast-scan direction previously referenced. However, using two or more rows of mirrors to create the dot pattern creates an additional complexity which, while not necessary in a single row device, is important in a multi-row device.

Turning to FIG. 9A, it will be noted that character 901 is an "A" in outline form and has been divided arbitrarily into a series of raster lines, each line having a series of even and odd bit (pixels) positions o, p, q, r, s, t, u, v and w. Thus, a particular raster line is created by two successive exposure lines, 902 and 903 (an even and an odd line) as shown. Note that these exposure lines (which represent a dot line as shown in FIG. 8A) are a fixed distance apart as determined by both the physical characteristics of the interspacing of the mirrors of DMD 60 and the optical magnification of the exposure module. This distance corresponds exactly to 2 dot lines. Remembering that the drum upon which character outline 901 is created actually moves orthogonally past these dot deposit lines (slow-scan direction). The spacing between the placement of odd and even bits can be electrically controlled by changing the delay time between their respective deposits on the drum. In the example shown, character outline 901 is moving upwards on the page.

As shown in FIG. 9A, DMD 60 is divided into two rows 910 and 911 corresponding to even and odd pixels. In a first instant of time, data from bit positions p, r, t and v of line n have been provided to DMD 60, and modulated by mirrors p, r, t and v of row 911. This will create on the drum of the xerographic printer the dots shown in the right section of FIG. 9A, where the p, r, t and v pixels have been darkened along odd exposure line 902. At this same instant of time, the remainder of that same line, namely pixels q, s and u, are put into delay register 1 of the even row of DMD 60.

In FIG. 9B we see the next instant of time when line n+1 is loaded into DMD 60, again causing pixels p, r, t and v to be activated, modulating the light rays so as to form the darkened image p, r, t and v along odd exposure line 902 at the right of FIG. 9B. At this instant of time, the information loaded into delay register 1 is moved to delay register 2 and new information pertaining to line n+1 is loaded into delay register 1. Note that character 901 has advanced upward one raster line due to rotation of the drum 80.

At the next instant of time odd exposure line 902 again provides modulation from DMD 60 such that pixels p, r, t and v pertaining to line n +2 are again exposed on the xerographic printing surface. At this period of time, however, even pixels q, s and u from line n have moved through delay registers 1 and 2 and now drive even pixels q, s and u to modulate light along even pixel exposure line 903. This is shown to the right in FIG. 9C where the q, s and u pixels are now darkened. Note that as shown in FIG. 9C, as the drum rotates past even exposure line 903, the full number of pixels on line n+1 have now been modulated by the modulated light from DMD 60. If there were more pixel lines on DMD 60, then the full exposure of the drum would require similar rotation by the drum and additional exposure lines to fully re-interlace the raster lines.

While the interlace of the respective DMD lines to form a single raster line of exposed dots in image 901 is straightforward, and handled entirely on the DMD chip by virtue of integral delay lines, registers 1 and 2, independent of the print controller, a further advantage can be realized. If the drum surface velocity varies due to the printer mechanism, and exposure time per raster line is held constant (as is necessarily the case for laser polygon scanners) then banding can occur. Banding is the compression (darkening) or expansion (graying) of the printed image at a characteristic, periodic frequency along the process (slow-scan) motion direction. In a system where these velocity variations are sensed by appropriate mechanisms in the printer, for example, shaft-encoders, the deleterious effect on print appearance can be subtracted by the printer controller by virtue of the variable timing of dot lines available using the DMD light modulator. If the drum has momentarily speeded up, the line being exposed is turned off early. Thus the distance exposed, or width of the raster line, as defined by the product of drum velocity, times time of exposure, can be held to a constant. Similarly, if the drum has slowed momentarily, the exposing line is held on slightly longer to compensate. By this sense-and-correct procedure, the proper overlap and line width of horizontal rasters can be assured by electronic means. This is not possible on a polygon system, where the added expense of precision transport speed control is the only option. Slow-scan banding is a major print quality failure mechanism in laser printers. Additionally, as they wear out it becomes worse. For printers where long life of the system is required, correction for banding as the mechanism ages is a significant performance advantage.

Along the same line, as explained by reference to FIGS. 9A, 9B and 9C, the horizontal overlap, or registration, of pixels is fixed by the optics and the DMD chip design, and is invariant. Therefore, the DMD system is immune to spot placement errors, defocus errors, and non-uniformity of exposure overlap along the fast-scan (raster) direction that is another print quality degrading mechanism in the laser polygon scanner.

As discussed, the amount of delay is proportional to the spacing between the pixel lines and is coordinated to the movement of the drum so that at a given instant in time the pixels form a visually solid line on the output with good resolution. Again, it must be pointed out that multi-line DMD 60 shown is only one of many alternative embodiments which can be utilized to provide the modulations for the light. Several different modulation devices can be utilized, either side by side or stacked, in a way to provide multi-line concurrent image projection onto the xerographic drum. This will yield different degrees of printing clarity and could be utilized to provide color graphics under different conditions. The modulated light from a single, or from sequential, devices could be used to image the respective color fields with a very precise registration thereby creating single pass full-color printing.

Printing System

Figure 11:
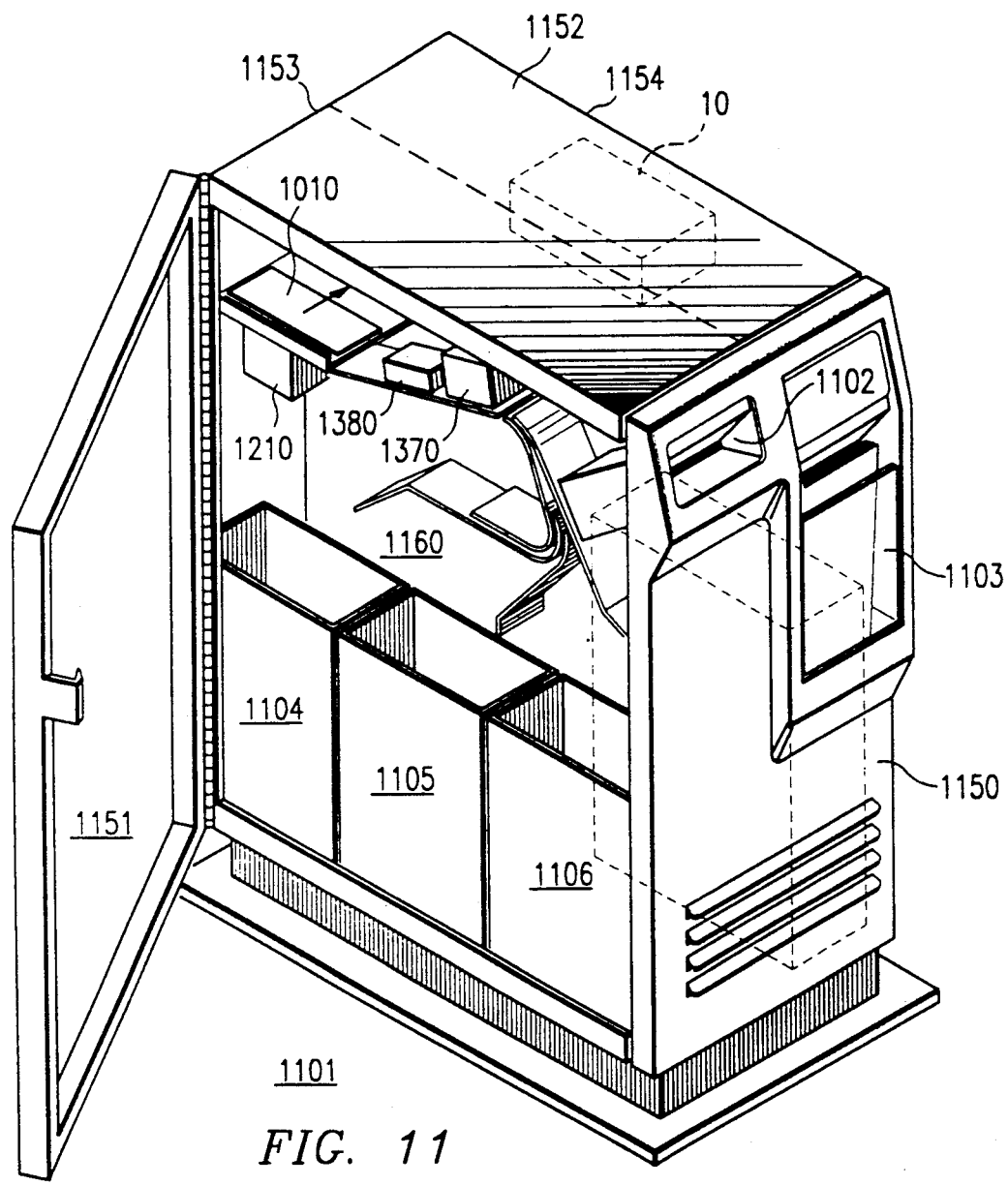
FIG. 11 shows a perspective view of a printing system with the left side door open.

One embodiment of a printing system using the xerographics process is shown in FIG. 11, which is designed, among other things, to handle automatic ticket printing. Bins 1104, 1105 and 1106 hold the accordion folded (tugger) ticket stock as will be seen. These bins can be closed as shown or can be designed to be open for easy access with only the corners provided to support and hold the stock in place. The front of machine 1150 has a revalidation slot 1102 for the insertion of a customer ticket which previously had been printed, and a bin 1103 to hold tickets which have passed through machine 1150 and which have been printed or otherwise handled by printing system 1101. Other equipment can be mounted on the front of the machine, and this equipment typically would be operative to receive credit card information or dialing information. This would allow a customer to call a ticket agency to obtain ticket information and to process travel tickets. The printing system could handle telephone communications and would have various lights and switches appropriate to these functions. For clarity these switches, keypads and other control equipment have not been shown.

Figure 20:
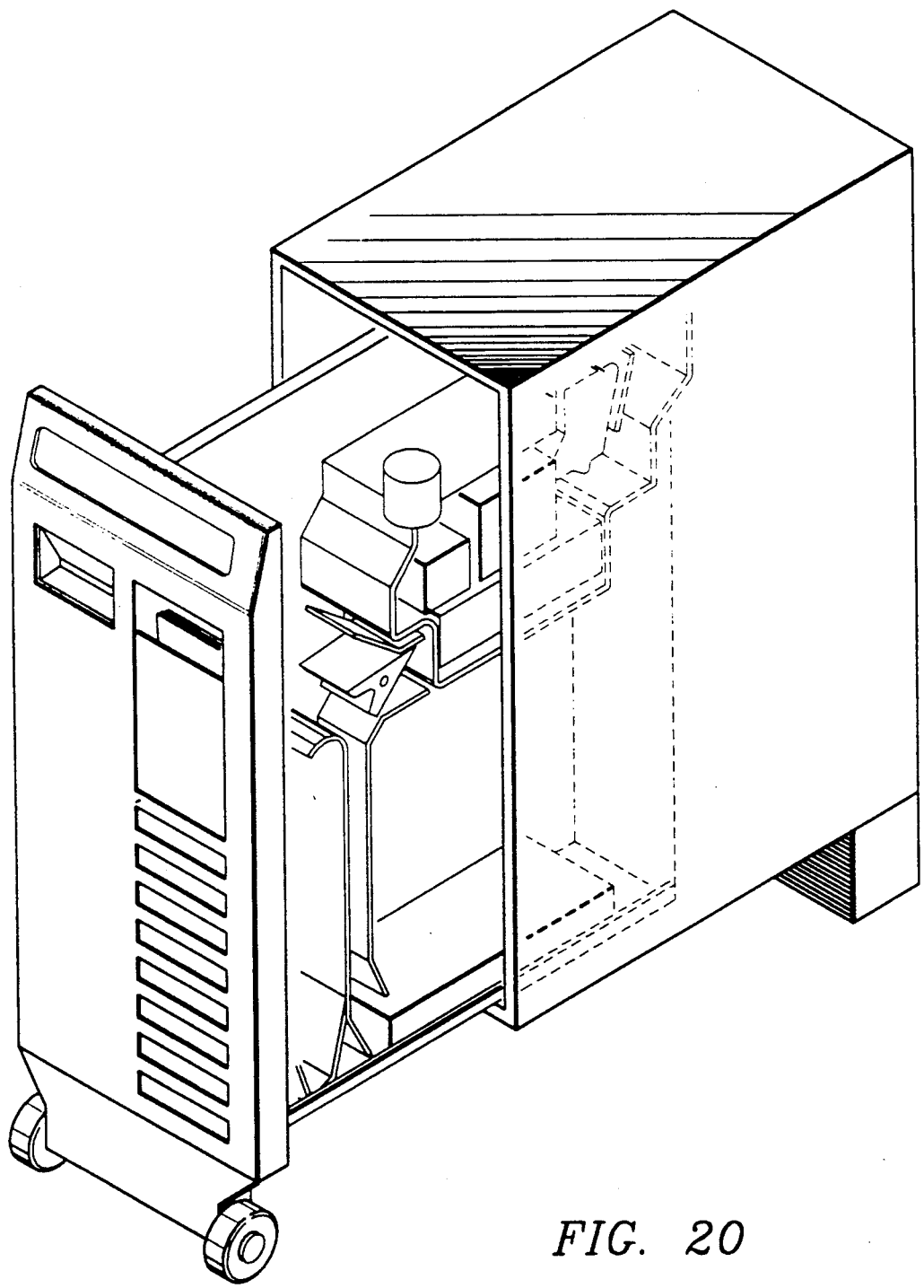
FIG. 20 shows the preferred embodiment of a printer housing.

The sides of printing system 1101 have been shown fitted with doors 1151 and 1154 (shown in FIG. 13), each of which can be opened for maintenance and for adding stock or other supplies to the printing system. A preferred embodiment of the printer system housing is shown in FIGURE 20 when the paper handling, control and printing mechanism is mounted in a manner to allow servicing from the front by a pull out mechanism. In both the door version and the door-less pull-out version, the inside of the printing system has been divided into two zones by a spine or vertical partition 1160 (FIG. 11). This partition performs several functions. One of these functions is maintaining the dust created by the bursting of the tugger stock away from the printing mechanism. This is so because the printing mechanism as seen in FIG. 13, is supported by vertical partition 1160 on the far (right) side as viewed from open door 1151. On the near (left) side, the tugger stock is directed from any one of the three bins, 1104, 1105, 1106, or from slot 1102 through magnetic and/or optic readers 1380, 1370, and via shuttle 1201 from the near side of partition 1160 to the far side. The ticket stock then moves from the back 1153 of the printing system along vertical partition 1160 toward the front 1150, passing below xerographic printing unit 1602 (FIG. 13) and through sorter 1501, to be deposited either in external bin 1103 or in internal bins 1561 or 1562. The spine design provides a precision reference plane for the assembly and alignment of the two parallel paper paths (magnetics side and printer side) and guaranties accuracy when passing a ticket from one path to the other via the shuttle mechanism (FIG. 12).

Figure 12:
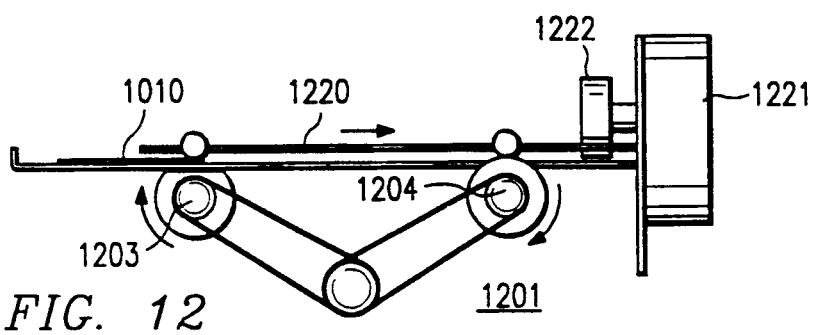
FIG. 12 shows details of the shuttle mechanism which moves coupons one side of the printing system to the other side.
Figure 13:
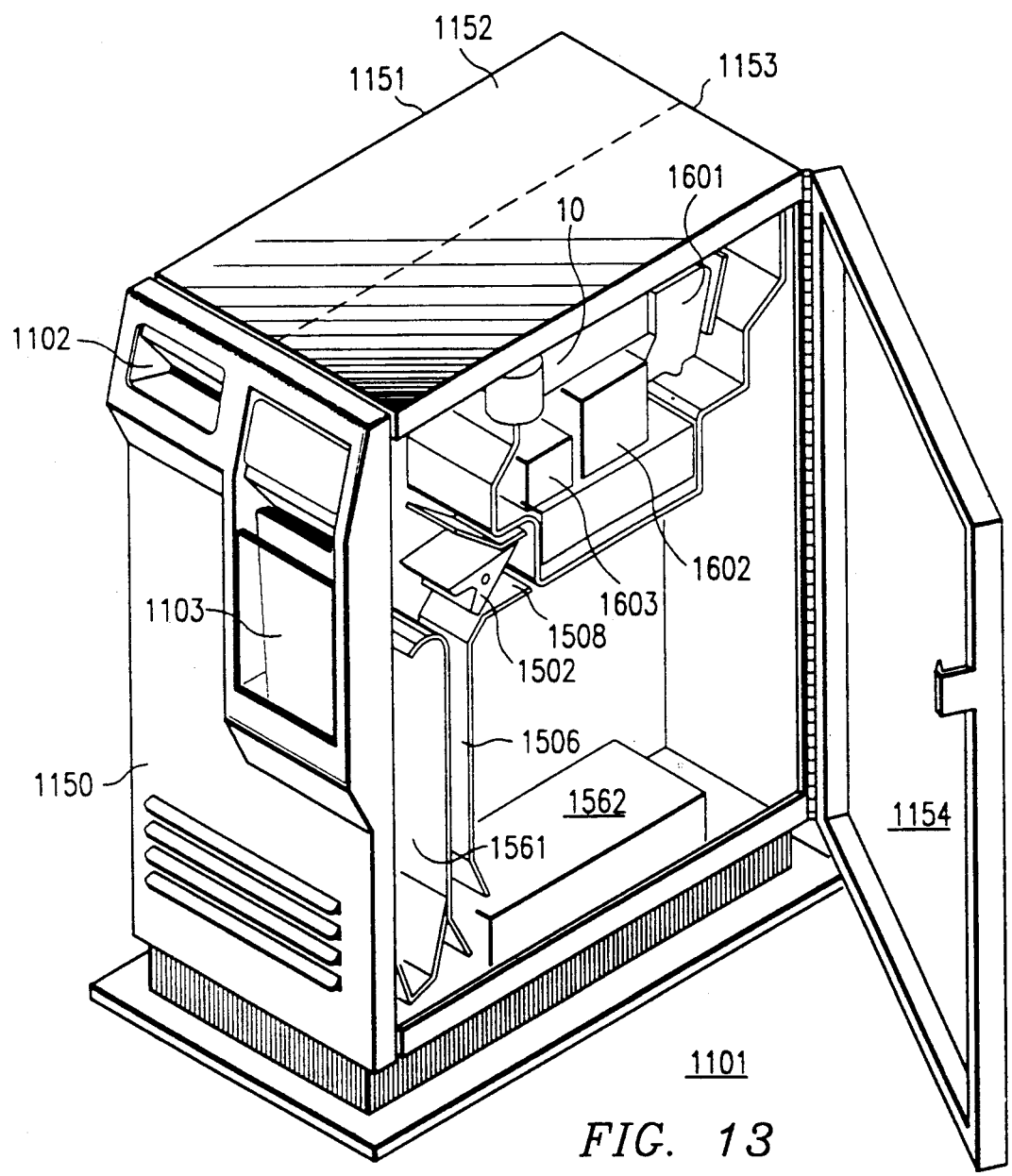
FIG. 13 shows a perspective view of a printing system with the right side door open.

FIG. 12 shows shuttle 1201 which operates to move the individual ticket stock 1010 from the near side of partition 1160 to the far side of the partition. Thus, as shown in FIG. 12, ticket stock 1010 enters shuttle 1201, moving directly toward the reader, and is shuttled from left to right, as shown by arrow 1220, by wheels 1203, 1204. Wheel 1203 can be advantageously arranged with a flat surface which rests upwards. After ticket stock 1010 arrives in place, wheel 1203 driven by a stepper motor begins to turn. The wheel grips the ticket stock, moving it from left to right. The ticket stock passes under wheel 1222 which also can be arranged with a flat surface at the bottom. When wheel 1222 begins to turn, ticket stock 1010 moves away from the reader along the far side of partition 1160. Thus, the only opening in partition 1160 is a small window large enough for the shuttle to pass the individual ticket stock 1010. This window can be designed, if desired, to prevent dust from moving from one side to another. This, of course, can be accomplished with a physical barrier or by air moving from the printer side to the ticket stock side through the window.

The actual movement of tugger stock 1010, 1010B, 1010C, from bins 1104, 1105 and 1106 is shown in FIG. 14 where each of the bins can provide printable stock material to burster 1730 via control wheels 1471, 1456 and 1451, respectively. These wheels are designed to move forward or backward and to move the stock as directed by the control mechanism of the system past burster 1720 and, as controlled by wheels 1455 and 1454, past optical reader 1470. The relative positions between wheel 1455 and burster 1730 is such that the stock can be positioned under reader 1470 while burster 1730 separates the stock into individual tickets. If the next ticket is not to come from the same tugger material, then wheel 1471 (or wheels 1456, 1451) could reverse and move the stock out of position so that stock from another bin, for example, tugger stock 1010B under control of wheel 1456, can move up into position under optical reader 1470.

The position of optical reader 1470 is such that information (such as bar code) prepositioned at the front leading edge of the ticket stock can be read by optical reader 1470 even before burster 1730 bursts the stock. This can be used for control purposes. The separated stock then moves through magnetic reader 1480 under control of wheels 1481 and 1482 into shuttle 1201 under control of wheels 1484 and 1483. Stock from outside slot 1102 enters the system under control of wheel 1452. This stock can be brought in and merged into the line of tickets moving toward shuttle 1201 simply by having the control system backup and reverse whatever tugger material is currently being controlled by wheel 1454. Thus, a customer may insert a ticket into slot 1102, the ticket can be moved to optic reader 1470 or to magnetic reader 1480. The ticket is then read and can then either be returned to slot 1102 by the reversing of control wheel 1454 or the ticket can be passed to shuttle 1201 and shuttled to the other side of the partition for printing or to be discarded in the manner to be more fully discussed hereinafter.

Turning now to FIG. 16, when a ticket passes through the opening in the partition 1160, the direction of the ticket, which on the first side of the partition was from the front of the printer toward the back along the partition, is now reversed, and the ticket moves along the far side of the partition toward the front of the printer. As it moves toward the front (right to left in FIG. 16), the ticket moves under printing module 1602 and comes in contact with drum 80 as above discussed. The ticket can be printed or left blank, depending upon the control of the system. As the ticket stock moves out from under drum 80, it passes through fuser 1603 where roller 1651 and 1650 serve in a well known manner to fuse the toner onto the stock so that the printed material cannot be easily removed.

The printed ticket stock then moves out of fuser 1603 and passes to sorter 1501 to be sorted in the manner to be discussed so that the ticket can either be deposited in outside bin 1103 or in one of several interior bins to be discarded, or to be stored for pickup by an operator at a future date.

Digressing momentarily, one method of operating the automatic ticket machine would be for a customer to insert a preprinted ticket in slot 1102 (FIG. 11). The ticket would then pass, as above discussed, through optic reader 1470 or magnetic reader 1480, and the information predeposited on the ticket would then be electronically read. Based upon this reading, or upon information provided by the user via a keypad or other device to a central computer, the user could make changes necessary in flight plans or in other travel arrangements or the user could just confirm a particular flight. The system, under control of the central computer (not shown), can return the ticket to the user in a situation where no change is to be made to the ticket. Alternatively, the ticket can be directed to shuttle 1201 (FIG. 11), through partition 1160, and then through printer 1602 whereupon additional information can (if so desired) be printed onto the ticket. The ticket then would pass to sorter 1501 and be sorted in a manner to be discussed and either returned to the user via bin 1103 or discarded to an internal waste bin. This latter operation, where the ticket is put into an internal waste bin, would take place in a situation where perhaps a new ticket is being printed for customer, or alternatively, where a customer has asked for a refund and the ticket has been confiscated by the automatic ticket machine.

While not shown, the automatic ticket system is connected either by cable, or perhaps by radio transmission, to a computer network. This system, because of its design, is easily mountable in a wall so that a user would only have access to the front of the machine while employees could, working behind the wall, open the machine for servicing, or add ticket stock, or remove discarded tickets, or tickets that have been printed. This latter feature is important for travel agencies where the central computer, which is remotely located and perhaps belonging to an airline or other travel service, generates a series of tickets, including boarding passes and other printed material during the night hours.

Returning now to a description of the operation of sorter 1501 as shown in FIG. 15. Tickets from printer drum 80 enter sorter 1501 at position 1508. Depending upon the status of diverter 1502, the tickets move via roller 1551 to slot 1506 and via rollers 1551 to bin 1562. Bin 1562 is an internal bin arranged for securely storing tickets as they are printed. The bin can be designed to be any size and can hold a full night's printing of tickets and boarding passes for pickup by an operator in the morning. The bin can be locked separately from the rest of the system so that only authorized personnel can remove the ticket.

Tickets which enter from printer drum 80 with diverter 1502 in the position shown can, instead of passing to bin 1563, pass to bin 1561 of diverter 1503 which is moved to the downward position (shown in phantom). This movement is controlled either locally or externally, and can be computer or manually activated. When moved to the phantom position, tickets pass under control of wheel 1551 into space 1560, and by movement of spring loaded latch 1504, pass into the reject or waste bin 1561 for pickup by authorized personnel.

Alternatively, tickets from printer drum 80 can be sent to external bin 1103 by moving diverter 1502 downward into the phantom position shown. Tickets then will move under control of wheel 1507 up and around and under what 1552 into bin 1103 and positioned under control of spring member 1504, which member could be arranged to sense when the bin is full for control purposes.

Thus, under control of either an internal or an external computer signal, transportation tickets, or any of a number of other items, can be either printed from stock material located internally or from material provided by a user via an external slot. Boarding passes can be printed simply by changing the printing on the ticket stock or by using different bins for different boarding passes. These can be color coded or preprinted in any type of arrangement, and the automatic ticket machine can be programmed, to select from any one of the three or more bins without operator loading or unloading the material. These tickets can be interleaved with tickets or boarding passes provided by a user via slot 1102 as has been discussed.

This then allows for machines such as these to be placed in shopping centers and in remote unattended locations so that customers can make travel reservations and have their tickets and boarding passes printed almost on-the-spot at a rate of 40 coupons per minute. These machines can be located in travel agencies or even in airport terminals.

FIG. 17 shows in schematic form the cutting mechanism for burster 1720. Stepper motor 1702 turns at a revolution of 200 steps per revolution turning cam arm 1703. Cam arm 1703 in turn is connected to cutter 1701 which moves up and down within the confines of burster 1720. Blade 1701 is shown in the up position in FIG. 17 and ticket stock 1010 (moving toward the viewer) is positioned such that the perforations between the coupons lie below the plane of blade 1701. The base of burster 1720 (not shown) is arranged with an indentation therein such that blade 1701, as it moves downward under control of cam arm 1703, will burst through the perforations thereby separating the coupons. Springs 1705 serve to push downward on coupon grippers 1704. Thus, when blade 1701 moves downward, grippers 1704 hold the coupon stock 1010 in position to prevent movement and to help align the perforations of coupon stock 1010 with blade 1701. Note that blade 1701 begins to perforate coupon stock 1010 from the left thereby reducing the force required as the blade falls.

Exposure Unit and Reproductive Unit Mating Arrangement

Figure 18:
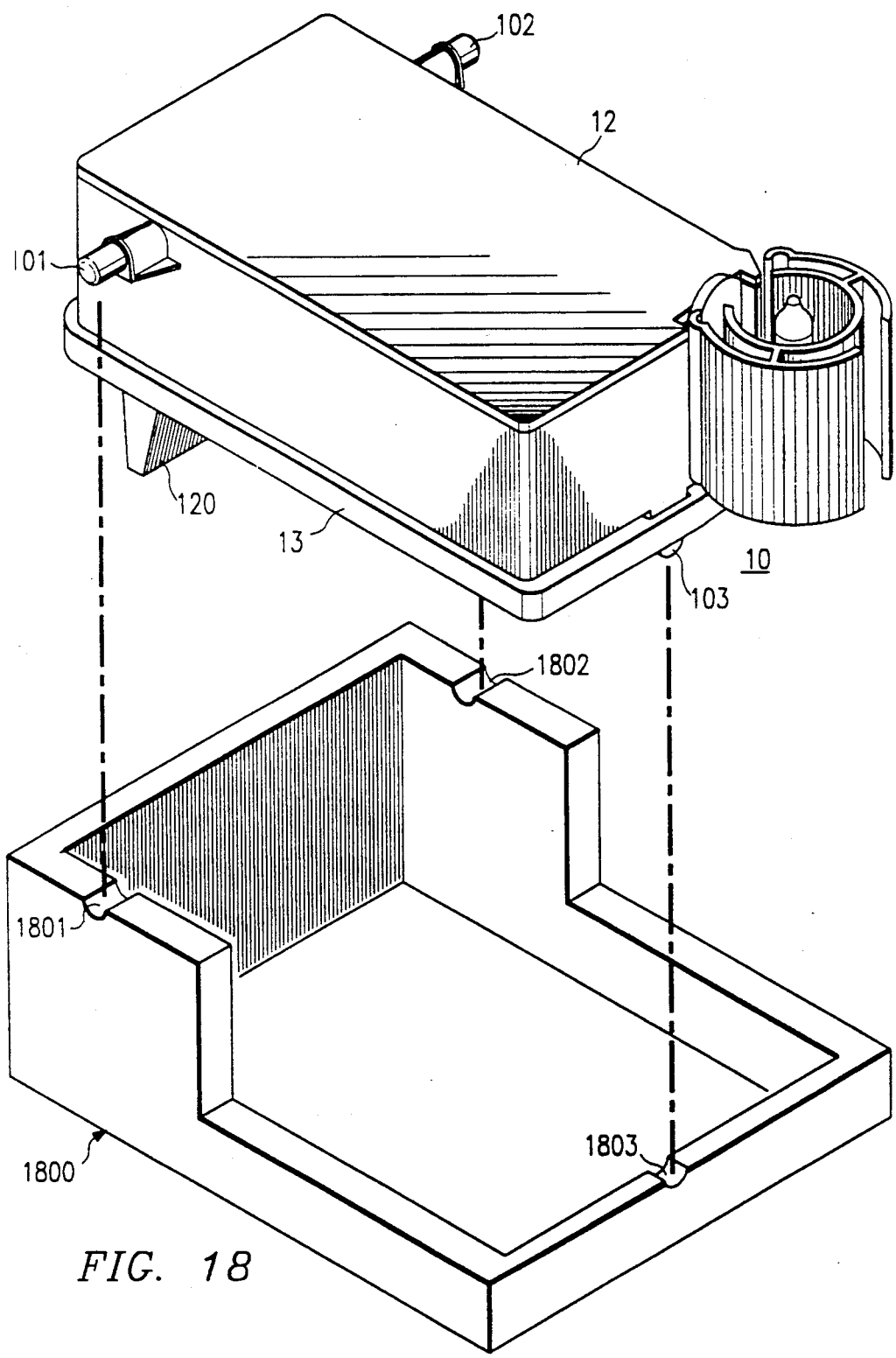
FIG. 18 shows coupling between the exposure and reproductive units.

FIG. 18 shows in stylized format the mating of the exposure unit 10 with a base 1800. The base 1800 represents the reproduction unit shown in stylized format since any one of a number of reproduction unit configurations can be utilized. Receptor position within base 1800 (not shown) would mate with the funnel 120 from the base of unit 10 to provide a light seal for modulated light prior to impact on the printing mechanism located in base 1800. As shown, ports 1801 and 1802 mate with protrusions 101 and 102 respectively, of exposure unit 10 while support 1803 is adapted to mate with tab 103 to provide a three point mating arrangement thereby maintaining perfect alignment between the two portions. Clips (not shown) can be positioned with respect to either unit 1800 or unit 10 to snap onto the other unit to maintain the units in position relative to each other.

For example, clips (not shown) could be permanently associated with the top surface 12 of unit 10. These clips can extend down below base 13 on either side of unit 10 and thus, when units 10 and 1800 are in mating relationship, the clips (not shown) would lock on the tabs (not shown) reference new drawing in preparation of the XRM unit for disclosure 10 on base 1800 to maintain the two units in secure relationship. Of course, the tabs could be replaced by traditional fastening devices, such as screws or bolts, for a more permanent connection. The clips, however, are useful in situations where the exposure unit is to be removed periodically from the base 1800 without the use of extra tools and by someone not particularly skilled.

By positioning a printing system such as the one disclosed herein at the gate of an airline, it is possible, because of the ability of the machine to electronically read the information prepositioned on a ticket or on a boarding pass, for the machine to accept an offered ticket, print validating material on the ticket, and either return the ticket to the user, print a new ticket, or confiscate the ticket, or any combination thereof. This then adds a new dimension to travel arrangements and travel control, and serves to speed up the entire reservation, boarding and control process for the travel industry.

Alignment Method and Apparatus

Exposure module 10, FIG. 1, is preassembled, except for DMD 60. The module is placed in a fixture such as is shown in FIG. 18 that locates housing 10 from three points, 1801, 1802 and 1803. The two alignment reference pins 1301 and 1302 are approximately coincident with the DMD y-axis. Note that housing 1800 shown in FIG. 18 is shown as representative and can house either the photoreceptor elements (such as element 80, FIG. 8A) or a camera (such as a CCD camera, FIG. 22) as will be discussed. The photoreceptor would be mounted at a distance d (FIG. 8A), below exposure module mirror 31 to produce a locus of line image 82 of width w extending between points a and b on drum surface 81, as previously discussed.

As will be discussed, one or more CCD cameras, such as camera 2200 (FIG. 22), can be positioned in place of the photoreceptor in order to assist in the alignment of DMD 60 within the exposure unit. The CCD camera advantageously can be positioned at the same distance from mirror 31 of the exposure module or at a different distance if so desired. The important factor is that the alignment of the optics for the DMD is with respect to the permanent three-point mounting pins and thus once aligned the exposure unit can be transferred from receptor to receptor without further alignment of the optics.

Prior to beginning a discussion of the actual insertion process it might be well to understand that there are three rotational axes and three translational axes that we are concerned with. These can be seen with respect to FIG. 7A where X is the up-down axis perpendicular to platform 14. The Y axis is parallel to the long axis (longitudinal) of the DMD array. The Z axis is along optical path 402. The next three axes are rotationally oriented with respect to the first three, namely psi ($\Psi$) around the X axis, phi ($\phi$) around the Y axis and theta ($\theta$) around the Z axis.

Figure 21:
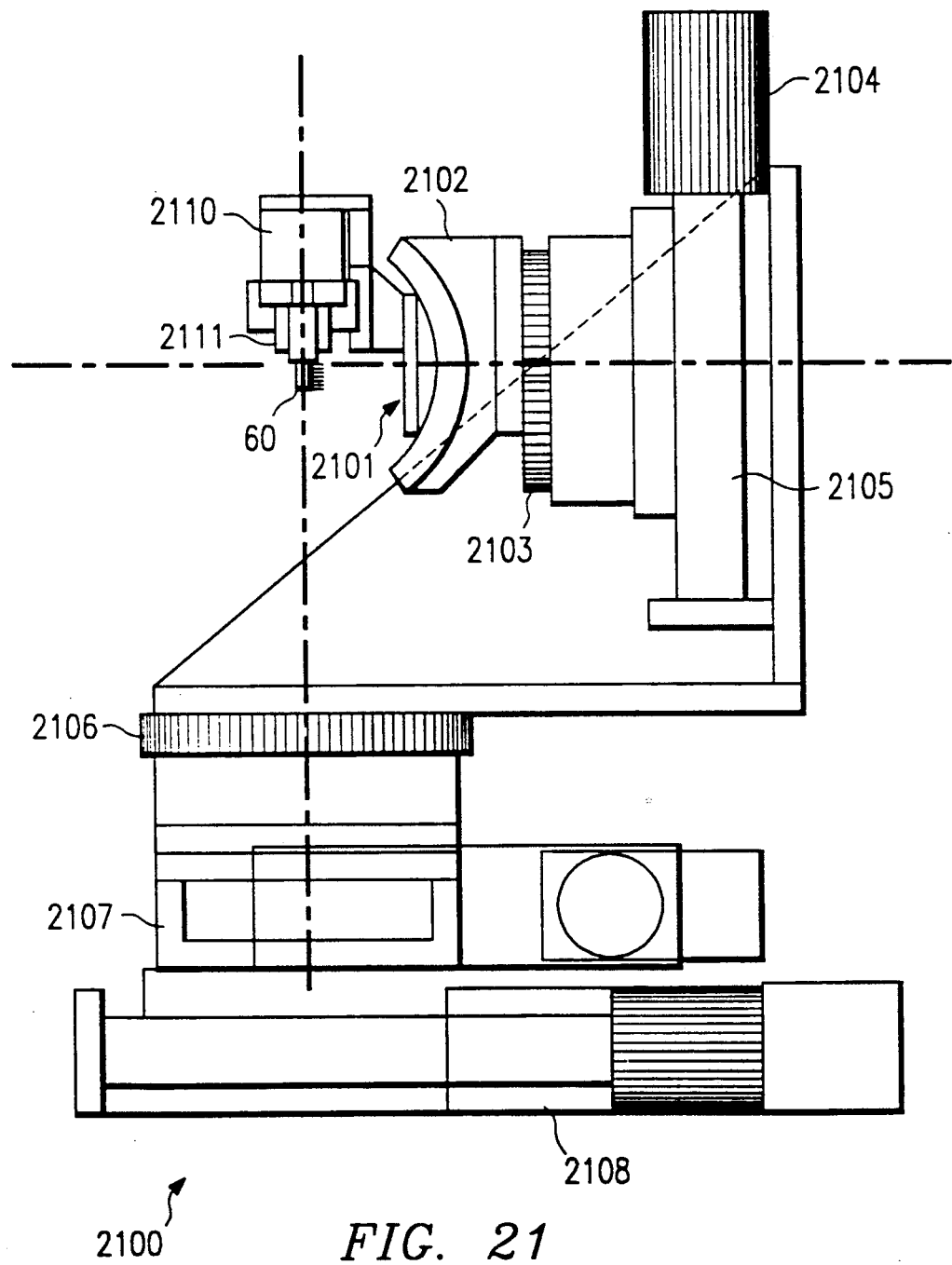
FIG. 21 shows a device for positioning a DMD in a module.

FIG. 21 illustrates one embodiment of an insertion device which, as will be seen, is driven by a computer to sequentially position a DMD, held by jaws 2111, around the six axes. Apparatus 2100 is designed so that the center of the rotational movement of a held DMD for the three major axes is around the exact crossing point of the three axes. This feature allows for sequential axis positioning.

The alignment process begins with the preliminary insertion of DMD 60 into Jaws 2111 of device 2100 and lowering into approximate final position with respect to support 104, shown in FIG. 1. Electrical contact is made with DMD 60 via cable 2220 from DMD pattern generator 2204, FIG. 22. Light source 16 (FIG. 1) is also activated.

Figure 22:
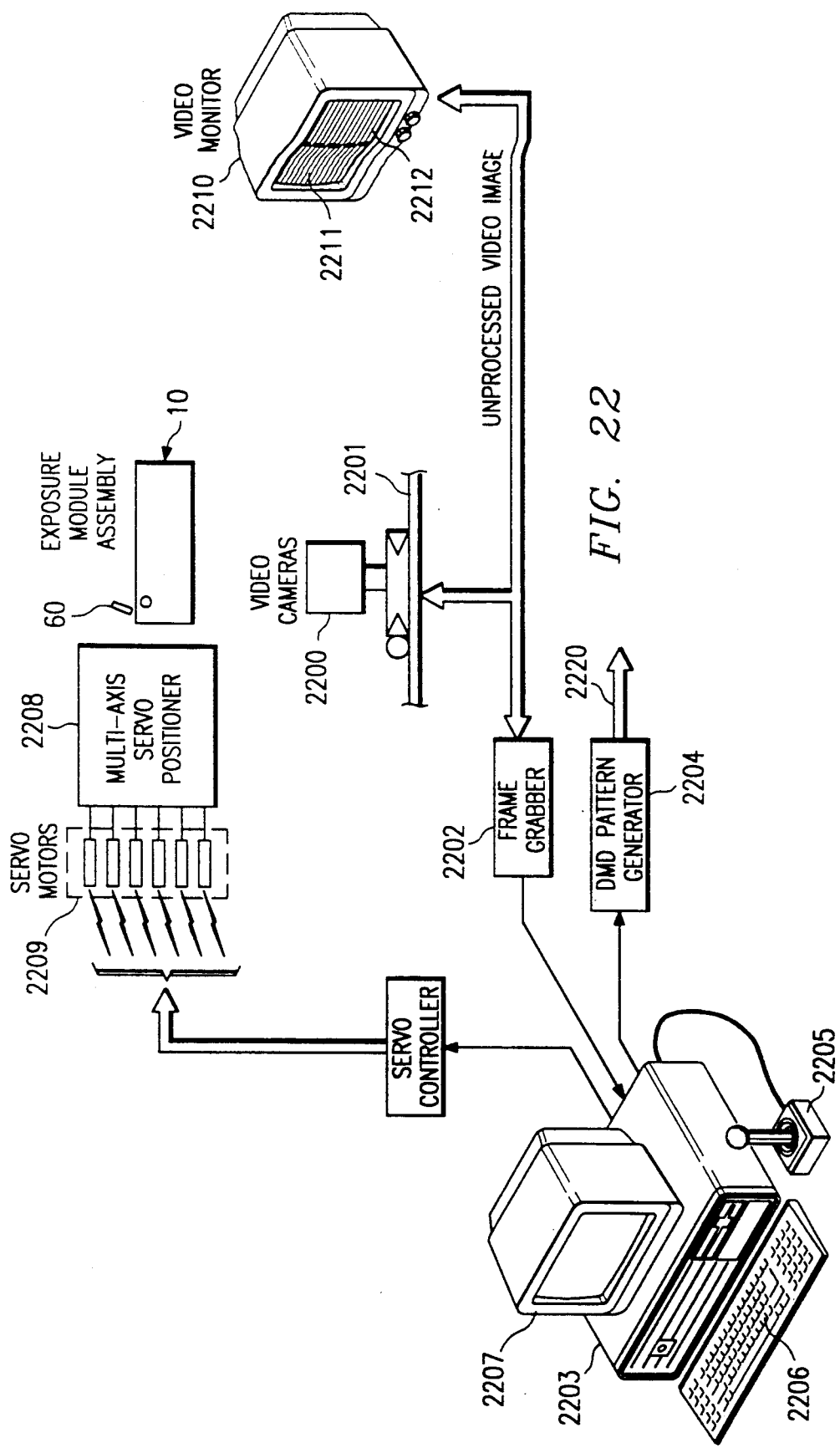

A preliminary center set of pixels is activated and the deflected light from these follows optic path 402 (FIG. 7A) to camera 2200 positioned as shown in FIGURE 22. A preliminary image appears on viewing monitors 2210 and 2207, and a rough alignment (Box 2501 and 2502, FIGURE 25), is performed by the operator using "joystick" 2205 override system. This alignment is sufficient to center the activated pixels on the viewing screen.

The automatic alignment process is then initiated and proceeds under control of computer 2203 according to the algorithm shown in FIG. 25.

The Cartesian axes of translation, x, y and z, lie in the plane of the DMD and are centered on the pixel array. The z-axis corresponds to the "focus" axis and the optical axis of the DMD-Imager lens system. The x-axis corresponds to vertical translation of the chip (across the direction of the pixel array), and the y-axis corresponds to lateral motion, along the long dimension of the pixel array. The rotation angles are Theta, Phi and Psi, corresponding to rotation about the respective axes z, y, and x. These rotations are, for convenience, referenced as to the attitude of an aircraft and called "roll", "pitch" and "yaw" corresponding to a pilot observing along the Z-axis.

The alignment begins as discussed above, by activating selected pixels in the center of the array, and adjusting the x and y travel to position this image on the optical axis of the imager lens, boxes 2501 and 2502 of FIG. 25. If this cannot be accomplished, the procedure is aborted. The positioning of the image at a specified location in the field of view of one camera accomplishes this. The camera stage is translated laterally along the DMD image until one camera lies directly in the center of the desired image position.

Figure 23:
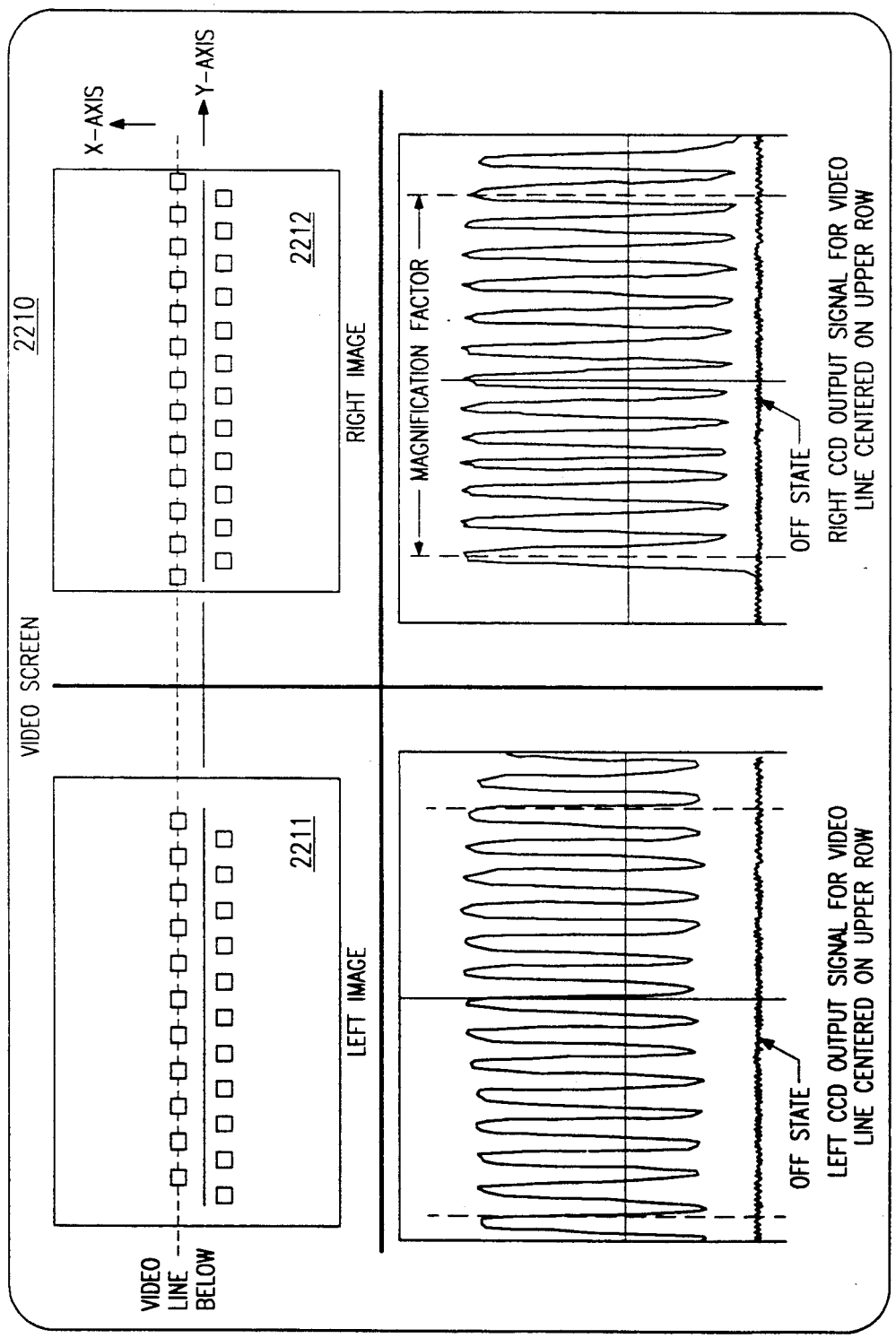
Figure 24A:
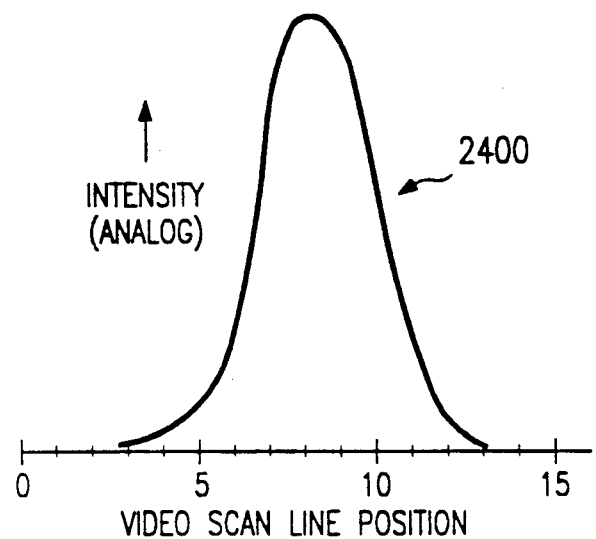
Figure 24B:
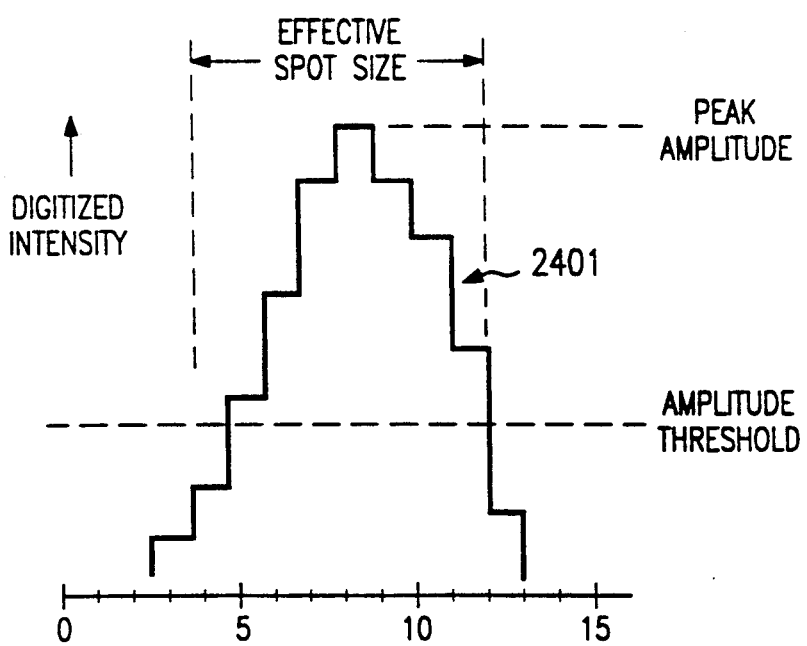

Next, the "roll" is corrected, box 2503, by rotating the DMD about optical axis z. Roll angle misalignment would appear as a "skew" angle in the DMD image at the camera, FIG. 23. In the printed output this corresponds to the actual use image not being orthogonal to the edge of the print media. The system refocuses the center image, which now consists of all activated pixels. Focus is accomplished by calculations performed on the size of the image of a pixel as captured by video framegrabber 2202 system The video data is stored in up to 256 levels of intensity. A size and centroid calculation is performed according to the criteria of FIG. 24A and 24B which shows a one dimensional slice of a pixel image. The frame grabber, in reality, contains a two dimensional representation of the amplitude (corresponding to the x and y orientations of the DMD chip). It is a straightforward matter to compare and calculate the centroid (effectively the center-of-mass of the light distribution) and compare it to a desired "location" in the field-of-view as represented by the frame-grabber memory map. Similarly, by choosing a threshold amplitude variable, and calculating how many pixels of the CCD (charge coupled device) video imager are above that threshold, the size, or focus, of a spot can be calculated. The z-axis servo is actuated to achieve the desired spotsize. Alternatively the peak amplitude, amplitude between adjacent pixels and other criteria, can be used to determine a focused condition.

The system then adjusts box 2505, the "pitch angle", phi, until pixel amplitudes are maximized. This motion centers the image of the source filament on the imager lens aperture, a condition for maximum power transfer to the image.

The final series box 2506 and box 2507 iterates the adjustment of "yaw-angle", or rotation of DMD about x-axis, with end-to-end focus adjust. The yaw angle also centers the filament image on the imager assuring maximum optical throughput and contrast ratio. However, because the x-axis of rotation is at the chip centerline, the ends rapidly defocus due to inherent z axis component of motion. Hence the iterative adjustment of yaw and focus box 2509. This adjustment also controls the uniformity, box 2520, or balance, of pixel image intensity across the array. When all criteria are satisfied, alignment is complete. If, after a succession of attempts box 2508 the criteria are not met, the program aborts, and an operator intervenes to assess the failure mechanism.

The six axes manipulator is designed to isolate, or orthogonalize as many of the degrees of freedom as possible. Only Psi and z remain coupled because a rotation about the x-axis causes both ends of the DMD to defocus. The computer system is essential to rapid performance of the left-to-right image measurements, and concurrent adjustment of these two parameters.

The system thus permits the final alignment of a complex optical system by effectively "flying" the DMD into position under computer control in a precise and rapid procedure.

Once the DMD is aligned finally, an adhesive, or other bonding arrangement, is used to firmly position DMD 60 with respect to brackets 104 (FIG. 1). At that time, jaws 2111 open and device 2100 withdraws from exposure module 10.

Toner Monitor System

Figure 19:
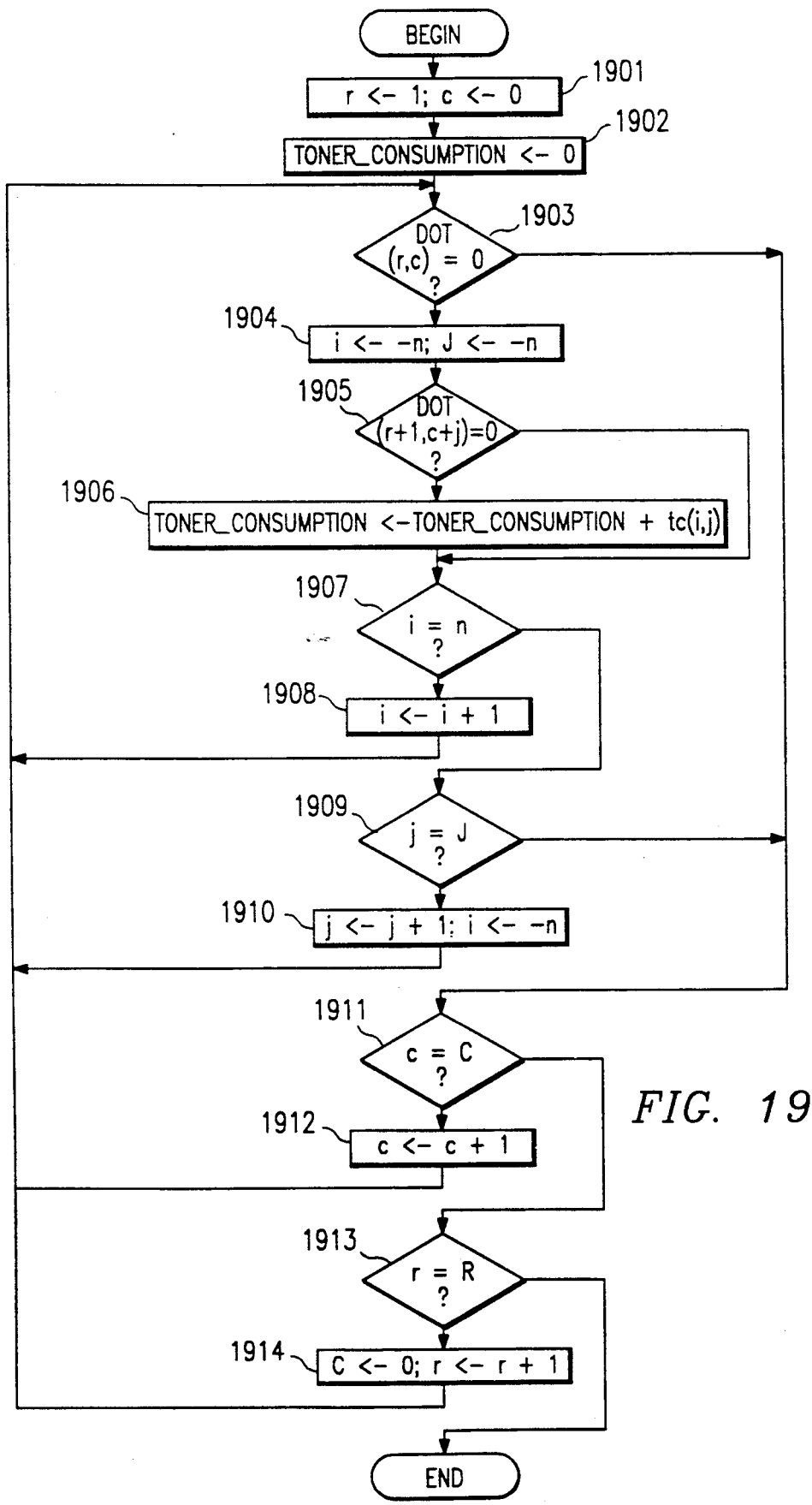
FIG. 19 shows a flow chart of the operation of the toner monitor system.

The toner monitor control system is shown in FIG. 19 and is based on two portions, namely a host portion and a printer portion. The host is assumed to be any control system (not shown), including a PC. The control system can be internal or external to the printer.

The system precomputes (by a host) a number representative of the quantity of toner required to reproduce an image. This number is stored with the image in the printer and used to maintain a more accurate measure of toner remaining in the printer (toner_reserve). In this implementation it is assumed that the toner_reserve is initialized at toner reload by a command from the operator and updated as described in the discussion to follow.

Note that discussions of raster graphics and rectangles are provided to show how maintenance of the quantity of toner remaining is practical for operations which do not involve printing a stored image. These print operations may be limited in speed by communications or the image generation algorithm and gains from implementing toner consumption computations in the host may be reduced. For these cases, toner consumption computations could be performed in the printer.

Host Portion

The host portion of the toner monitor system consists of generating the appropriate toner consumption measure for all images to be stored (or printed) by the printer. The algorithm may be implemented as part of the image generation algorithm or as a procedure which operates on a previously generated image. The latter will be assumed in order to reduce the complexity of the description.

The algorithm shown in FIG. 19 begins with a bit mapped image in memory, computes the toner consumed by each dot, and sums the toner consumption for each dot in the image. The algorithm operates by moving a two dimensional array of constants over a bit mapped image (also a two dimensional array). The sum of products of the constant array and corresponding positions in the bit map is computed for each element in the bit mapped image array. A reference point in the constant array (usually the center) is referenced to the position in the image array for which the sum of products is currently being computed. The "sum of products for each element is added together to complete the image toner consumption computation.

- dot(r,c) is an array of single bit variables with a value of one or zero, r is the row number, c is the column number, R is the number of rows in the image, C is the number of columns in the bit mapped image, array elements with subscript numbers outside the range (1 through R, 1 through C) are initialized to 0, the actual array size is $(R+2n) \times (C+2n)$
- the array dot(r,c) may be stored in a packed format, 8 elements per byte. "dot(r,c)=0?" which appears in the flow chart is then implemented using a function call
- n is the distance from the current dot to furthest dot which may impact toner consumption
- tc(i,j) is an array of weighing factors for the dots which impact toner consumption where i and j range from $-n$ to $+n$, tc(0,0) is the toner consumed by an isolated dot, these constants are determined empirically for the print technology being used

---

Printer Portion

For the bit map image print commands,
<PRINT_BIT_IMAGE_ESCAPE_SEQUENCE>
<bit_map_image_id>
<image_position>
a bit map image storage format of the following form is assumed:
bit_map_image_toner_use
bit_map_image_width
bit_map_image_height
begin data
.
.
.
end data
This image would be installed, possibly by downloading, in the printer after creation by the host, typically the bit_map_image_toner_use would be generated by the host, as discussed above, during or after image generation, but prior to installation in the printer. When the printer receives a print bit mapped image command,
<PRINT_BIT_MAPPED_IMAGE_ESCAPE_SEQUENCE>
<bit_mapped_image_id>
<bit_mapped_image_row_location>
<bit_mapped_image_column_location>,
in addition to generating the image, performs the following computation:
toner_reserve <- toner_reserve - bit_map_image_toner_use.
 Characters may be printed by implied command, a printable character in the data stream to the printer, or by explicit command,
<PRINT_UNPRINTABLE_CHARACTER_ESCAPE_SEQUENCE>
unprintable_character
In either case the printer uses an image from a collection of stored character image bit maps called a font to print the character. The character cell storage format,
character_toner_use
character_cell_width
character_cell_height
first_data_byte
.
.
.
last_data_byte
contains a character toner use value which is used to update toner reserve:
toner_reserve <- toner_reserve - character_toner_use.
 The font would be created by the host and installed or downloaded in the printer. The character_toner_use would be generated by the host during or after image generation, but prior to installation in, or downloading, to the printer. See the host portion of the implementation description for the algorithm which generates character_toner_use.
 To accommodate raster graphics, an additional command is sent from the host which operates directly on the quantity of toner remaining. Raster graphics consists of a sequence of commands which print rows of dots.
<RASTER_GRAPHICS_ESCAPE_SEQUENCE>
<#_of_bytes_of_data>
first_data_byte ... last_data_byte
<RASTER_GRAPHICS_ESCAPE_SEQUENCE>
<#_of_bytes_of_data>
first_data_byte ... last_data_byte
.
.
.
<RASTER_GRAPHICS_ESCAPE_SEQUENCE>

-continued

Printer Portion

```
<#_of_bytes_of_data>
first_data_byte ... last_data_byte
These commands are followed by a command which updates the
quantity of remaining toner.
<TONER_LEVEL_UPDATE_ESCAPE_SEQUENCE>
<#_to_subtract_from_toner_level>
Upon receipt of this command the printer performs the
following operation:
toner_reserve <- toner_reserve -
#_to_subtract_from_toner_level
The #_to_subtract_from_toner_level is computed by the host
based on the image generated by the preceding sequence of
raster graphics commands.
    To accommodate rectangle commands, the same approach
is used. Following a print rectangle command.
<PRINT_RECTANGLE_ESCAPE_SEQUENCE>
<rectangle_width>
<rectangle_height>
<fill_parameter_1> <fill_parameter_2> ...
<fill_parameter_n>
a toner level update command is sent form the host.
<TONER_LEVEL_UPDATE_ESCAPE_SEQUENCE>
<#_to_subtract_from_toner_level>.
which initiates the following operation in the printer:
toner_reserve <- toner_reserve -
#_to_subtract_from_toner_level
```

Based on these calculations, this level of toner is known at all times. When the calculated level varies from the actual level, a problem is indicated. These calculations, then, can be used to signal an operator as to toner availability. Since toner usage depends upon the type of graphics used and not on the number of pages of printing, very precise advance warning can be given.

Replaceable Elements for Xerographic Print Module

To meet the system requirements for the ticket printing environment, it was necessary to design a modular xerographic print engine compatible with the ATB system paper-path, chassis form-factor, and lifetime and service requirements. This printer system is comprised of four modular components that readily insert into a chassis, or receiver module, that is in turn demountable from the airline ticket and boarding pass printer (ATB) central spine. The printer is designed around an imaging system using a toner-based, optically exposed, xerographic process. Several parameters factor into the design process. The considerations of reliability and service lifetime require a ruggedized design, with several elements capable of quick, easy replacement. Three of these elements form the expendable, or consumables components that make up the xerographic process. The print-head, exposure module, is a fourth replaceable element. The receiver module, or Xerographic Print Module (XPM), forms the fifth replaceable element of the print engine. The system requires a design with a short, straight-through coupon path to maximize the mean number of coupons between jams (MCBJ). When a jam occurs, it must be quickly and easily cleared, with consideration of the heated surface of the fuser unit and operator safety. The consumable elements must be packaged to meet specified coupon counts between replacements that were substantially greater than the typical page count found in the industry for the user serviceable desk-top laser printers. The XPM itself has a service life requirement 5× to 10× that of the typical desk-top laser printer. The fuser assembly and print-head assembly are not user replaceable units.

The penalty usually associated with user replaceable consumables is a high cost per-page of print. This is acceptable in the general desk-top printer environment for the convenience, the resulting high print-quality, and the cost is offset by fewer service call requirements. Downtime is also typically reduced from hours to minutes. All of these features are highly desired by the ATB market place, but higher consumables costs are not desirable, due to competitive pressures from thermal, ion-deposition, and impact matrix printing technologies. To reduce consumable module costs, new design standards had to be met. In particular, the toner-developer unit, representing over 50% of consumable costs, must have sufficient toner capacity to print approximately 50,000 coupons at a 4¼ coverage factor. At that point, the cost of the components in the developer unit amortize out to acceptable levels. By contrast, the typical replaceable cartridge, that contains toner, in a desktop laser printer, is specified for about 2500 prints, a factor of 20× less (7× less allowing for area factors of the coupon to the A-size page).

Similarly, the lifetime for the photoreceptor, typically an organic, 2-layer design (called OPC for short) due to its low material and manufacturing costs, is relatively short. This is primarily due to abrasion from the contacting parts of the process (e.g., paper, toner and cleaner mechanism), the comparative softness of the organic polymer materials comprising the OPC substrate, and the performance degrading effects of the charging and exposing part of the process. In fact, ozone produced by the charging and transfer corona wires is a major cause of degradation of the OPC. In tight, compact desk-top laser designs, residual ozone can substantially shorten OPC lifetime. For these reasons, the OPC life can be as little as 3000 pages, and is typically less than 20,000.

The ATB printer is designed to service a high-volume environment, up to 40,000 printed coupons per month. Obviously, the user cannot be expected to replace consumables units every day-or-two, or be constantly running past the consumables service life during peak print demand periods. The requirements for extended consumable unit lifetime, and low cost-per-page for consumables (e.g., amortization of the disposable elements over many printed coupons) went hand-in-hand to achieve the ATB consumable cost goals. They exceed typical industry experience by large factors, and encompass user replacement of elements not previously considered as consumable units. In the case of the DMD printhead per-se, this is possibly only by virtue of its low cost and simplicity of alignment to the XPM unit.

With a peak system demand goal of 40,000 printed coupons per month, the consumables elements were designed for replacement frequency of greater than one month, and further designed to have respective replacement cycles that were even multiples of one-another, thereby minimizing the number of printer shutdown cycles and maximizing up-time. Table A delineates the consumable unit life expectancy and illustrates the fact that the replacement cycle is "modulo" 50,000 coupons. Therefore, the replacement frequency is 4 developer units to 2 OPC cartridges to one fuser unit. The XPM and printhead (not listed) are rated at 2 million coupons.

TABLE A

CONSUMABLES REPLACEMENT SCHEDULE

| Item | Coupons/Unit |
| --- | --- |
| 1. Developer Unit 1601 | 50,000 |
| 2. OPC Cartridge 1602 | 100,000 |
| 3. Fuser Unit 1603 | 200,000 |

A further advantage of the fuser unit replaceability is that the entire ATB printer system can be easily adapted to 110 volt operation or 220 volt operation simply by switching fuser units. This simplifies both manufacturing planning and inventory problems.

Description of Xerographic Process Module

Figure 26:
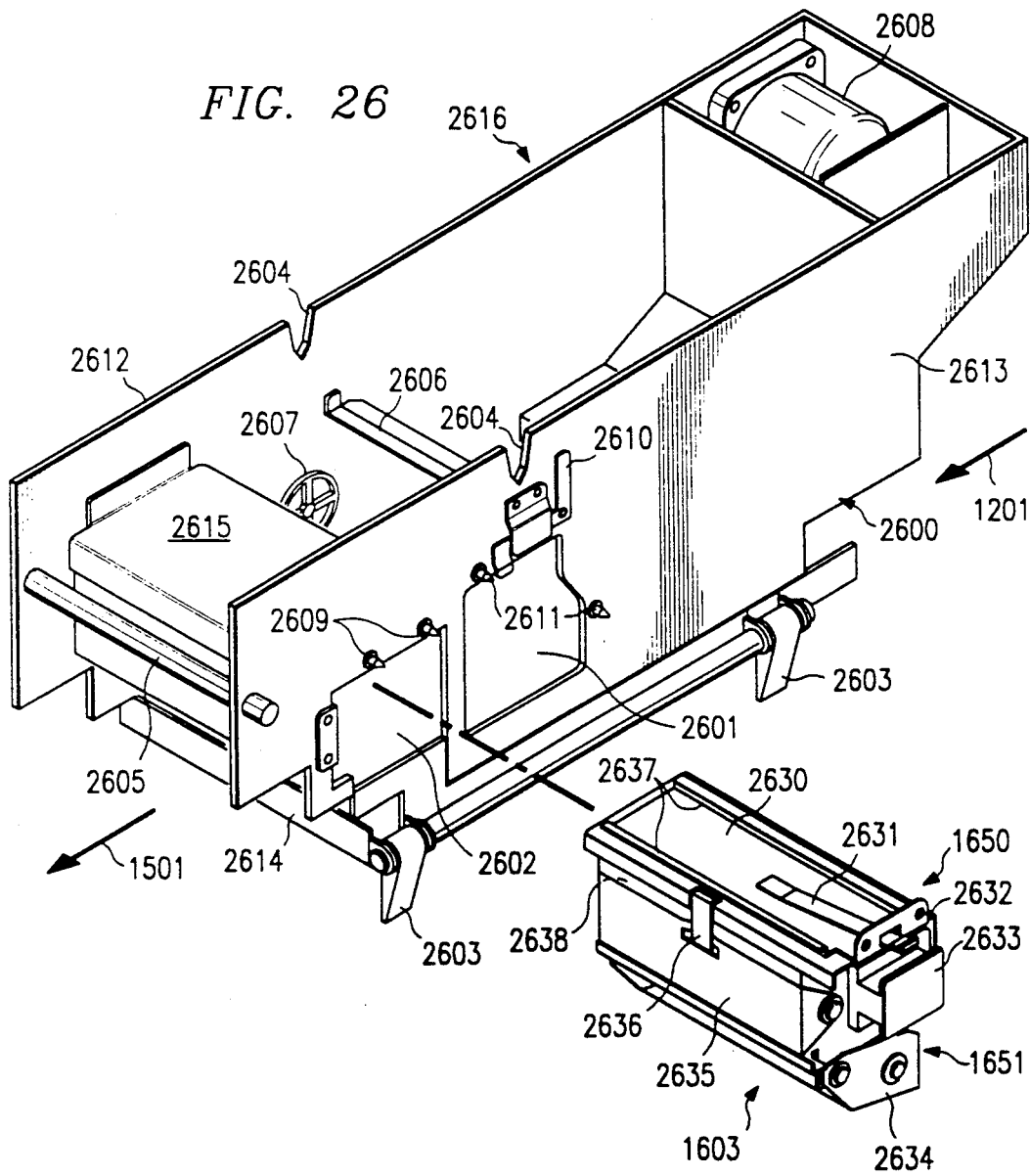
FIG. 26 shows the replaceable fuser unit.

FIG. 26 shows the XPM module which serves as the receiver for all the remaining consumable units, providing positioning, power and precision relative alignment for each of the units.

The XPM provides power and synchronization of the rotating process module (Fuser, OPC, developer and coupon transport rollers) via a precision motor 2608 and a toothed-belt and gear transmission 2616 (not shown) on the side 2612 internal to the ATB central mounting wall. The inside wall of the XPM also contains high-voltage power supplies for the charging corona 2702 (FIG. 27), and transfer corona (not shown) which resides in the lower tray 2614 directly below OPC drum 80, and below the coupon path (1201 to 1501). The precision reference notches 2604 position the DMD exposure module 10 via molded-on features 102 and tab 103 which rests on cross-rail 2605. Power to OPC cartridge 1602 is provided through XPM side-plate 2612 via mating wheel 2607. Fuser shield 2615 provides isolation of fuser 1603 heat lamp 2638, not shown, but residing inside fuser heat roller 1650 (FIG. 16).

Coupon path 1201 to 1501 passes below developer unit 1601, below but in contact with OPC drum 80 in cartridge 1602, and between fuser heater roller 1650 and fuser pressure roller 1651. Fuser pressure roller 1651 is clamped via dropdown mechanism 2334, and is clamped by a spring loaded pin-fixture (not shown) residing in lower tray 2614 which drops down when clips 2603 are released, thereby exposing the entire paper path to the operator when ATB chassis is pulled out for service (FIG. 20).

Continuing in FIG. 16, roller 1651 and roller 1653 separate from rollers 1650 and 1652 respectively when tray 2614 drops to clear the paper path. As shown in FIG. 26, tray 2614 is hinged to XPM 2600 along side-plate 2612. Opening 2602 accepts fuser unit 1603 and positions it with respect to XPM paper path via guide rails 2637 and with positioning pins 2609 mating to holes 2632 in fuser 1603. Positive engagement is provided by latch-spring 2631. Removal/insertion is aided by thermally insulating handle 2633. Latch 2636 releases metal bracket 2635 containing fuser cleaner roller (now shown).

Tray 2614 must be lowered to remove fuser unit 1603. Heat shield 2630 further isolates user from hot roller 1650 contact.

Figure 27:
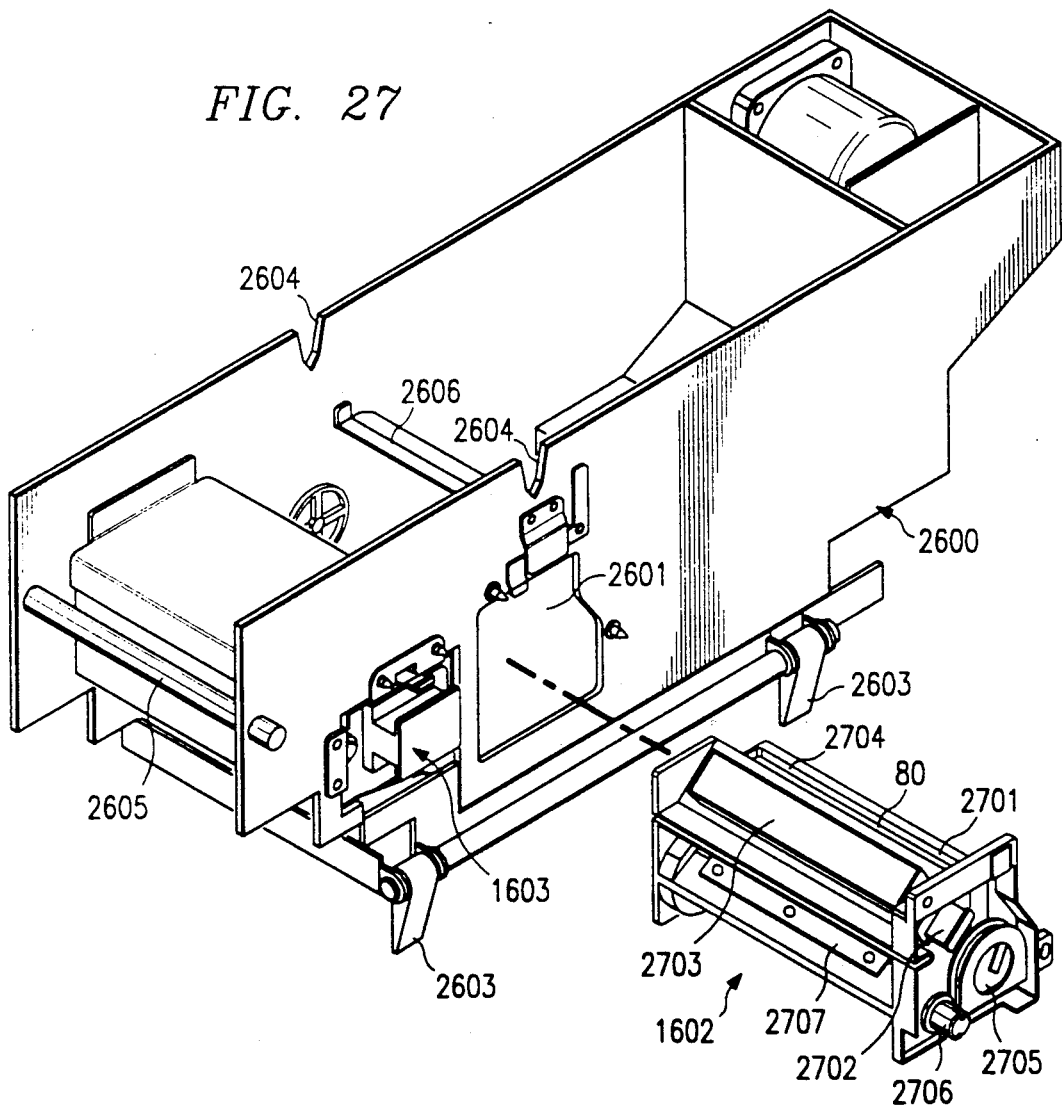
FIG. 27 shows the replaceable photoreceptor cartridge.

Turning now to FIG. 27, opening 2601 is designed to accept OPC cartridge 1602 which mates to XPM via molded-in rails 2701 and other features that mate to guide 2606, and drive cog 2607, and positioning pins 2611 on XPM side-plate 2613. Latch 2610 prevents removal of OPC cartridge 1602 prior to removal of developer unit 1601. Likewise, OPC 1602 is restrained by tray 2614 until it is dropped. Hence the fragile OPC drum surface 80 is protected from abrasion by developer unit 1601 magnetic brush 2802 and other elements parallel to and close-by the OPC surface. Latch 2610 cannot be operated until developer unit 1601 is removed from XPM 2600. Flip down tab 2705 provides a grip for OPC removal.

OPC cartridge 1602 is further comprised of removable charging corona 2702, cleaner blade 2707 and cleaner auger (not shown), waste toner exit port 2706, ozone filter 2703, drum 80, exposure access slot 2704, and mating slide surfaces 2701.

Figure 28:
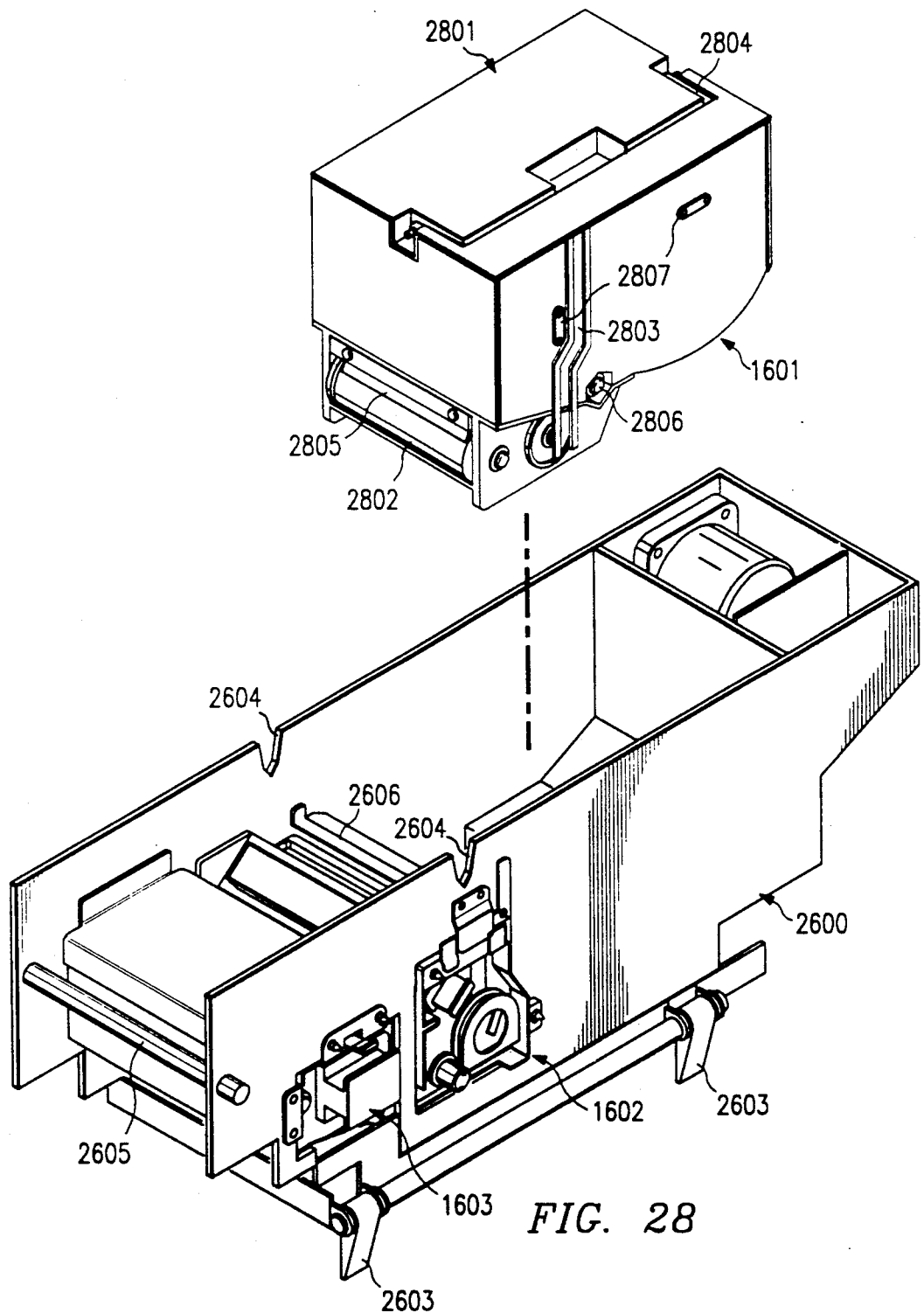
FIG. 28 shows the replaceable developer unit.
Figure 29:
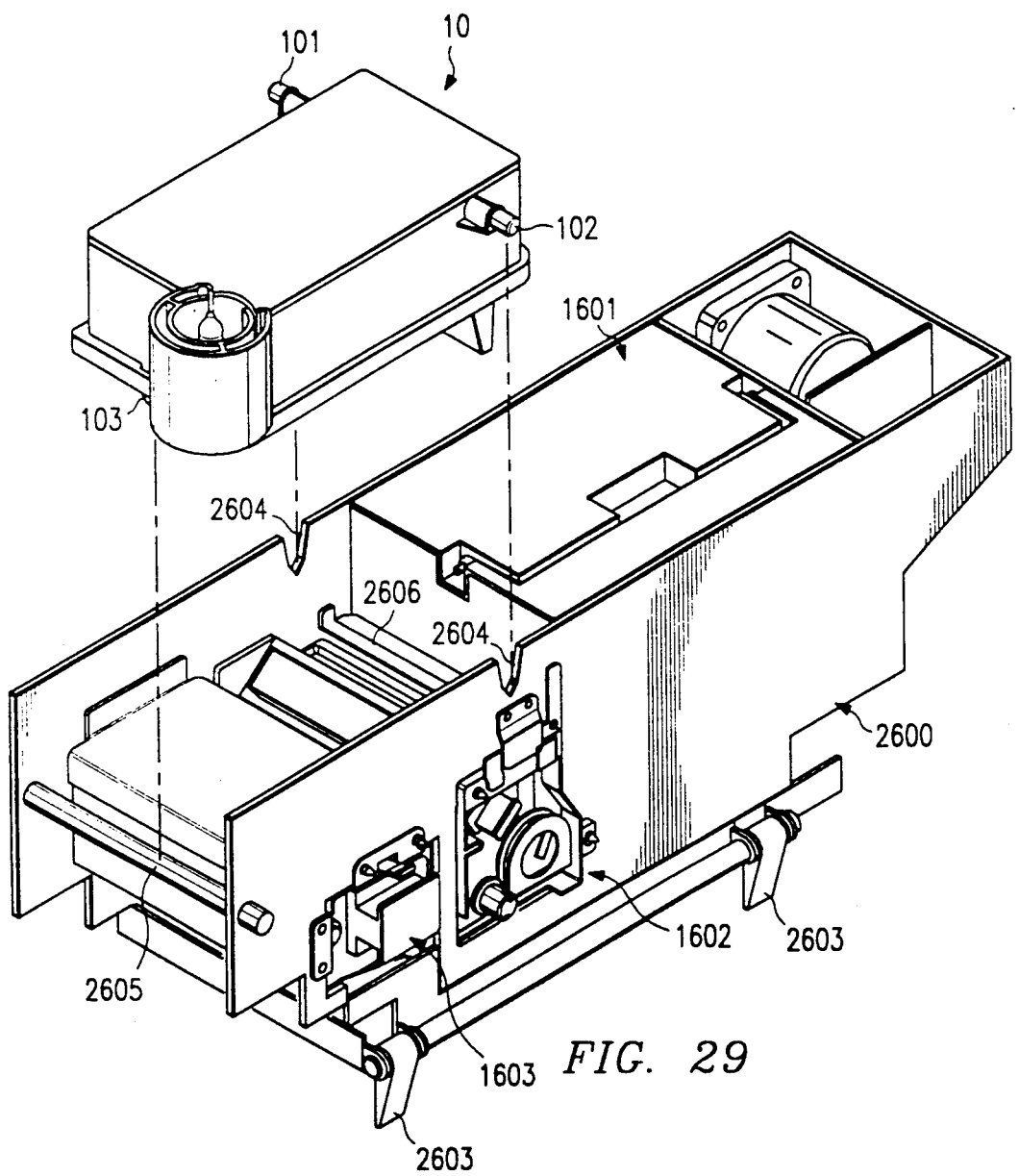
FIG. 29 shows the replaceable exposure unit.

As shown in FIG. 28, a developer unit 1601 is designed to drop in from the top via molded in guide rails 2803 and handle 2804 when ATB is pulled from the enclosure (FIG. 20). Because it is the most frequently replaced consumables unit, top access is desirable for operator convenience and for ease of insertion. From the top side, visual alignment is more readily accomplished, and lighting is usually better. Magnetic brush 2802 holds a developer material which is in turn coated with the electrostatically charged toner particles. Doctor blade 2805 regulates the magnetic brush. Power to rotate the magnetic brush and other internal rollers 2806 of developer unit 1601 is provided in synchronization with the OPC via gears in the power train 2616 on XPM side-plate 2612. Large capacity toner reservoir 2801 (seen cut-away in FIG. 16) is a feature that allows a 50,000 coupon lifetime. Because of the narrow field-of-print, distribution of toner is less of a problem than in the wider A-size developer units. Wiper bars 2807 are provided internally to toner reservoir 2801 to allow effective distribution and full utilization of the toner supply.

What is claimed is:

1. A printing system exposure unit, said exposure unit comprising
   a) a source of light separately positioned with respect to
   b) a spatial light modulator device such that unmodulated light from said source falls upon said device, said device comprising;
      i) a substrate;
      ii) at least one linear array of pixel elements positioned over said substrate, such that an air gap exists between said array of pixel elements and said substrate, each said pixel being electrostatically deflectable;
      iii) addressing circuitry arranged in said substrate beneath said pixels, said addressing circuitry operable upon receipt of a serial data signal to select ones of said array so as to electrostatically deflect and latch said selected ones such that light from said selected ones is directed to said focusing apparatus, said addressing circuitry being arranged only on areas of said substrate physically removed both above and below said linear array of deformable mirror elements, thus separating the spatial light modulator superstructure from lying directly above the substrate structure;
   c) a focusing lens for accepting light from said selected ones of said array;
   d) mounting supports integrated into a removable housing containing all elements of said exposure unit in proper optical alignment, to removably attach to said exposure unit to said printing system while maintaining a proper alignment, such that said exposure unit is entirely contained within the confinements of said housing.

2. The spatial light modulator exposure unit set forth in claim 1 wherein said exposure unit is required to provide a row length of r pixels for said printing system, selected from pixels of said spatial light modulator device which contains m pixels, where m is greater than r, wherein the desired dot-line of information consisting of r pixels can be electronically shifted left or right within said m pixels, by said addressing circuitry, to permit alignment of the printed image to the print media.

3. The spatial light modulator exposure unit set forth in claim 1 wherein said linear array of pixels are arranged into two substantially parallel rows, separated by exactly twice the row height, and interdigitated with the even pixels in the first of said rows and the odd pixels in the second of said rows, wherein said pixels are slightly larger than the effective pitch of the combined rows thereby establishing some overlap of the edges of the respective pixels in the two rows.

4. The spatial light modulator exposure unit set forth in claim 2 where in said addressing circuitry comprises first and second substantially parallel arrays of delay buffers preceding a mirror driver element on said first row, so that serial line data introduced to the deformable mirror device is split into two sets of bits, one set of bits going to said first row only after an intervening electronic delay of approximately two dot-lines, thereby spatially reinterlacing the pixels of the first row with the corresponding second row pixels at a photoreceptor approximately two dot-lines later.

5. The printing system set forth in claim 1 wherein said exposure unit further comprises a lens housing having a central flat surface for aligning said focusing lens to said deformable mirror spatial light modulator, said housing having a first end for holding said light source also in alignment to said deformable mirror spatial light modulator.

6. The deformable mirror device spatial light modulator exposure unit set forth in claim 5 wherein said spatial light modulator is an elongated rectangular structure supportable by its sides in a plane substantially perpendicular to said flat surface of said exposure unit, further including locating features for attachment of said spatial light modulator, such that said features permit a degree of translation and rotation of said modulator device with respect to the optical axis of said exposure module.

7. A system for modulating light energy, said system comprising:
 a) a source of light energy;
 b) a spatial light modulator device, said modulator device including:
  i) an array of deflectable pixel elements deflectable into at least two orientations with respect to said energy source;
  ii) addressing circuitry arranged so as to follow each element of said array to be independently operable for modulating a reflected image of the source of said light energy along a common first axis under control of a modulating signal input to said circuitry and for modulating said reflected image of said source along a common second axis when said modulating signal input to said circuitry is of opposite binary sense, said images of said source separated when reimaged in the aperture plane of imaging lens by a dead-band, defined as containing no appreciable light energy from either the modulated or unmodulated image of the light source;
 c) a lens element for directing light from said source to said modulating device;
 d) an imaging lens displaced from said set of pixel elements and arranged along said first axis.

8. The deformable mirror device spatial light modulator exposure unit set forth in claim 6 wherein said exposure unit further includes a channel in said flat surface, said channel arranged to receive light rays from selected pixels to be reimaged onto a printer photoreceptor by said focusing lens.

9. A printing system exposure unit comprising at least two spatial light modulator devices, said exposure unit including a feature for adjustably mounting said devices with respect to the other devices, offset from said other devices such that respective images of all said spatial light modulator devices can be independently aligned so as to operate in concert to produce a continuous exposed light image in a printing system.

10. The method of establishing an exposure unit for a xerographic printing system where images are created on a photoconductive surface for transfer to a printed surface, said method comprising the steps of:
 establishing a source of light rays at a first location within said unit;
 positioning a substrate at a second location within said unit, said substrate containing at least one row of spaced apart individually selectable and rotatable mirrors;
 directing said light rays onto a desired active area of said substrate by positioning lens elements constrained by said exposure unit to collect, direct, and suitably aperture light rays from said source onto said substrate to form an image of said source rays magnified so as to fall at, and substantially fill, the aperture of a subsequent imager lens;
 constructing a light ray baffle between said first and second location, said baffle being a series of sawtooth steps with walls of said steps perpendicular to the optic path of light rays reflected by said mirrors;
 mounting a reflected light ray imaging lens in conjunction with said baffle such that said light rays controllably reflected from said mirrors to said imaging lens will be focused via said lens onto said surface; and
 adjusting said substrate so that light rays from said source which impinge on said substrate are reflected away from said imaging lens by said wells of said light gathering baffle when said mirrors have not been selected for rotation and such that upon the selective rotation of any mirror light rays from that selected mirror will pass through said baffle without impacting said baffle walls and thence into an aperture of said imaging lens.

11. The method set forth in claim 10 wherein said exposure unit has a base, and wherein said substrate is positioned on one side of said base and said surface is positioned on the other side of said base, and wherein said focusing of said image on said surface includes the step of:
 transmitting said image to at least one mirror positioned to reflect said image to said surface via a slot in said exposure unit base.

12. The method set forth in claim 10 wherein when the velocity of said surface rotations fluctuate, a banding of the final printing image occurs and wherein said substrate includes at least two rows of selectively addressable mirrors, said method further including the step of:

coordinating the selective timing of said rotation of mirrors in alternate rows to coincide with variations in rotation of velocity of said surface so as to electronically compensate for said banding.

13. A method of operating an electrophotographic printing system to avoid undesirable banding of the final printing image due to a fluctuations in the rotation of a photoreceptor drum, said system using an exposure unit containing a and deformable mirror spatial light modulator device array, and a source of light separately positioned with respect to said spatial light modulation devices such that unmodulated light from said source illuminates the entire array of said device and a focusing lens for accepting light selectively reflected from certain pixels of said device, and wherein said pixels of said substrate include at least two rows of selectively deflectable mirrors, said method comprising the steps of:

electrostatically deflecting selected ones of a plurality of pixel elements within each line formed in a substrate, said deflecting controlled by addressing circuitry also formed in said substrate in response to input signals;

receiving data representative of the rotational velocity of said photoreceptor drum;

processing said received data to determine the variation of the surface velocity about a desired nominal value, and calculating a correction value to be added to or subtracted from the deformable mirror deflection time; and instantaneously applying the correction value to the selective timing of said deflection of mirrors in alternate pixel rows to coincide with variations in rotation an velocity of said drum so as to electronically reduce said mechanically introduced banding in the printed image.

14. The method set forth in claim 13 wherein said focusing apparatus is operative to communicate images to a drum in a xerographic printing process.

15. A system for modulating energy, said system comprising:

an energy modulating device;

a source of energy arrayed at an angle to said energy modulating device, and directed onto said device by intervening optical lens elements;

said device operable for modulating said energy to provide an array of independent energy modulated spots, and said device comprising a set of deflectable elements which can be displaced into at least two orientations with respect to said energy source, each said element independently operable for focusing a reflected image of said energy source along a common first axis under control of a modulating signal and for focusing said reflected image along a common second axis when said modulating signal is not present, said images separated by a dead-band; and an energy baffle at least partially surrounding and disposed along both said axes, said baffle arranged to pass said first axis reflected images while attenuating said second axis reflected images.

16. The system set forth in claim 15 wherein said common first axis passes through the center of an imaging lens lying concentrically within said energy baffle, and wherein said first axis is perpendicular to said energy modulating device.

17. The system set forth in claim 16 wherein said dead-band is wide enough to maintain separation of said images at common plane of focus.

18. The system set forth in claim 16 wherein said common first axis plane of focus is approximately the aperture plane of said imaging lens.

19. The system set forth in claim 16 wherein said intervening optical lens elements form reflected images at said aperture plane of suitable magnification to create within said dead-band no image energy of said source; and wherein said dead-band lies midway between respective images of said source formed along said common first axis and said common second axis.

20. The system set forth in claim 16 wherein the angle between said reflected images of said energy source is determined by the deflection angle of said deflectable elements of said modulation device.

21. The system set forth in claim 16 wherein said source is arrayed at an angle with respect to said modulator device to position images of said source along said first and second common axes to permit maximum energy transfer to said imager lens of said reflected energy image.

* * * * *